(12) United States Patent
Sugimoto et al.

(10) Patent No.: US 7,345,733 B2
(45) Date of Patent: Mar. 18, 2008

(54) LIGHT DEFLECTION ELEMENT, LIGHT DEFLECTION DEVICE AND IMAGE DISPLAY DEVICE

(75) Inventors: Hiroyuki Sugimoto, Kawasaki (JP); Toshiaki Tokita, Kanagawa-ken (JP); Yumi Matsuki, Kanagawa-Ken (JP); Shigeaki Nimura, Kangawa-Ken (JP); Masanori Kobayashi, Kanagawa-Ken (JP); Yasuyuki Takiguchi, Kanagawa-ken (JP); Kenji Kameyama, Kanagawa-ken (JP); Ikuo Katoh, Kanagawa-ken (JP)

(73) Assignee: Ricoh Comapny, Ltd., Tokyo (JP)

( * ) Notice: Subject to any disclaimer, the term of this patent is extended or adjusted under 35 U.S.C. 154(b) by 0 days.

(21) Appl. No.: 11/401,276

(22) Filed: Apr. 11, 2006

(65) Prior Publication Data

US 2006/0181671 A1   Aug. 17, 2006

Related U.S. Application Data

(63) Continuation of application No. 10/241,796, filed on Sep. 12, 2002, now Pat. No. 7,057,700, which is a continuation of application No. 10/052,368, filed on Jan. 23, 2002, now abandoned.

(30) Foreign Application Priority Data

Sep. 19, 2001   (JP) ............................. 2001-285409
Sep. 20, 2001   (JP) ............................. 2001-287907

(51) Int. Cl.
  *G09K 19/02*   (2006.01)
(52) U.S. Cl. ...................................... 349/172; 349/171

(58) Field of Classification Search ................. 349/39, 349/40, 72, 101, 130, 133, 141, 172, 196, 349/171

See application file for complete search history.

(56) References Cited

U.S. PATENT DOCUMENTS

| 4,813,767 A | | 3/1989 | Clark et al. | |
|---|---|---|---|---|
| 5,132,826 A | * | 7/1992 | Johnson et al. | ............... 349/18 |
| 5,243,455 A | * | 9/1993 | Johnson et al. | ............... 349/18 |

(Continued)

FOREIGN PATENT DOCUMENTS

JP            05-216075          8/1993

(Continued)

OTHER PUBLICATIONS

Tokita, T., et al., *P-108: FLC Resolution-Enhancing Device for Projection Displays*, SID 02 Digest, ISSN/0002-0966X/01/02/3301-0638, © 2002 SID, pp. 638-641 (May 2002).

*Primary Examiner*—Ahshik Kim
(74) *Attorney, Agent, or Firm*—Dickstein Shapiro LLP

(57) ABSTRACT

A light deflection element has a pair of transparent substrates 2, 3; a chiral smectic C phase liquid crystal 5 with a homeotropic alignment filled between the pair of transparent substrates 2, 3; and at least an electric field applying device 6 for activating an electric field in the liquid crystal 5. Because a chiral smectic C phase liquid crystal is used, the problems of the conventional light deflection element, such as high cost, light loss, large size, and optical noise etc. due to its complicated structure, can be greatly improved. The conventional low response time due to the smectic A phase or the nematic liquid crystal is improved, thereby the high-speed response is possible.

19 Claims, 24 Drawing Sheets

U.S. PATENT DOCUMENTS

| | | | |
|---|---|---|---|
| 5,250,217 A | * | 10/1993 | Shinjo et al. .......... 252/299.61 |
| 5,315,419 A | * | 5/1994 | Saupe et al. ................. 349/131 |
| 5,453,861 A | * | 9/1995 | Shinjo et al. ............... 349/133 |
| 5,493,426 A | | 2/1996 | Johnson et al. |
| 5,514,297 A | | 5/1996 | Shinjo et al. |
| 5,552,912 A | | 9/1996 | Sharp et al. |
| 5,642,214 A | | 6/1997 | Ishii et al. |
| 5,847,790 A | * | 12/1998 | Andersson et al. ......... 349/100 |
| 6,137,557 A | | 10/2000 | Hebiguchi et al. |
| 6,614,491 B2 | | 9/2003 | Hasegawa et al. |
| 6,624,859 B1 | | 9/2003 | Sugiyama et al. |

FOREIGN PATENT DOCUMENTS

| | | |
|---|---|---|
| JP | 07-020417 | 1/1995 |
| JP | 07-092507 | 4/1995 |
| JP | 07-110482 | 4/1995 |
| JP | 10-239676 | 9/1998 |

\* cited by examiner

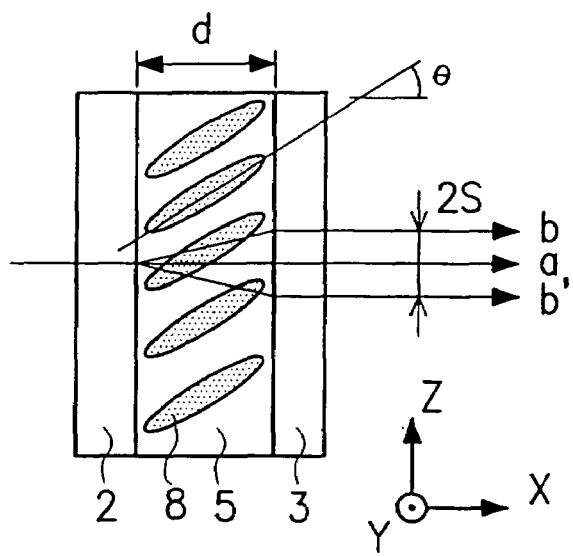
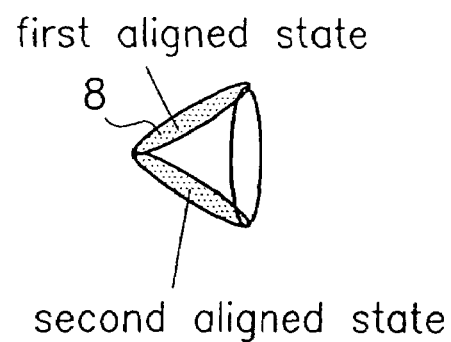
FIG. 3A
FIG. 3B
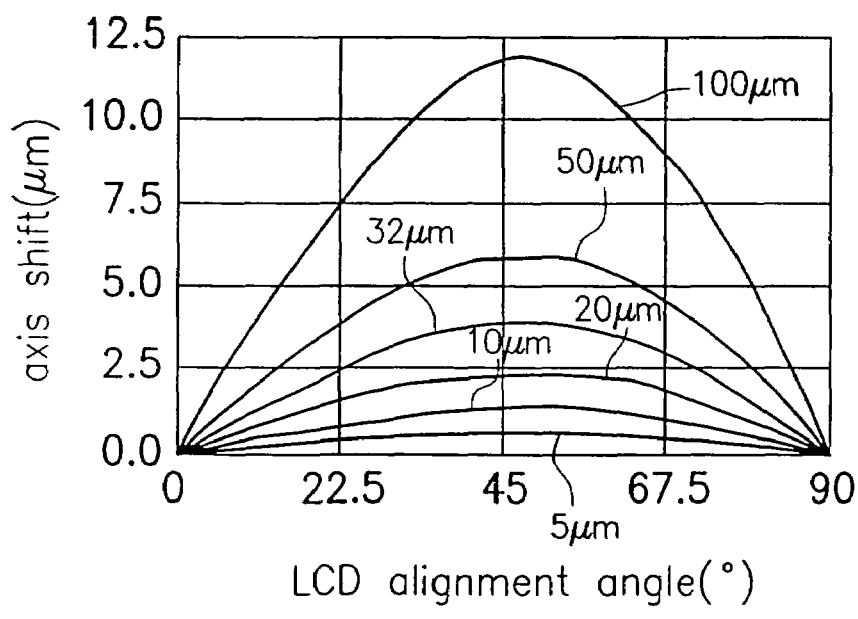
FIG. 4

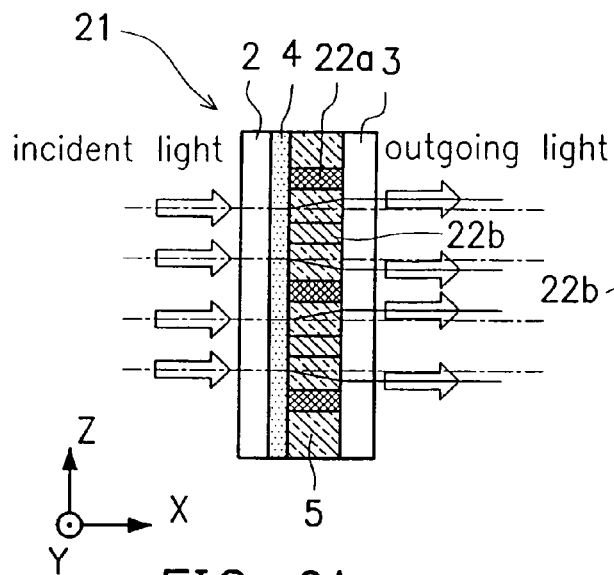
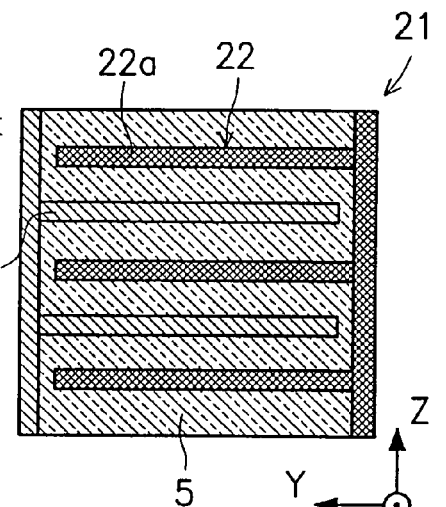
FIG. 9A     FIG. 9B
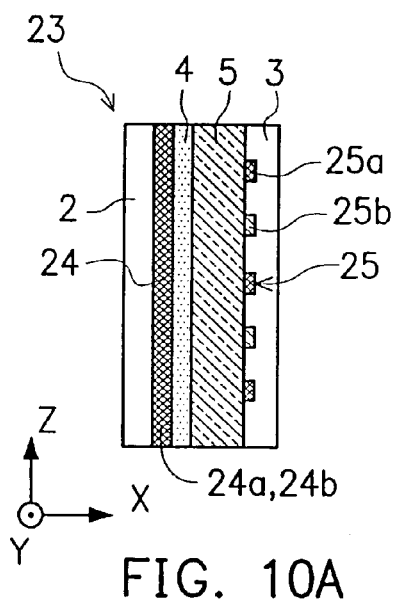
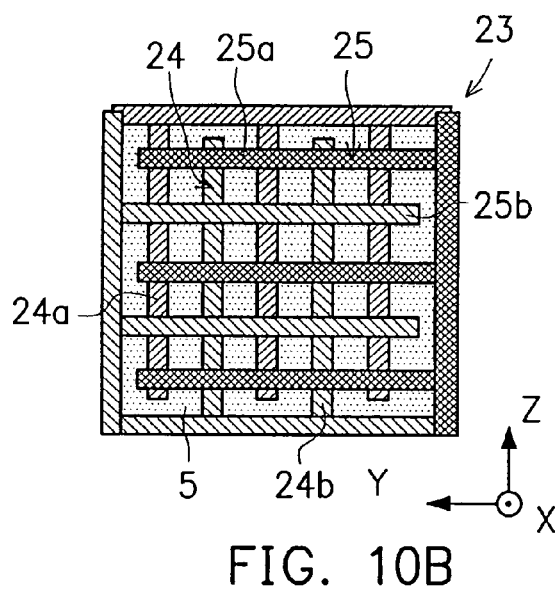
FIG. 10A     FIG. 10B

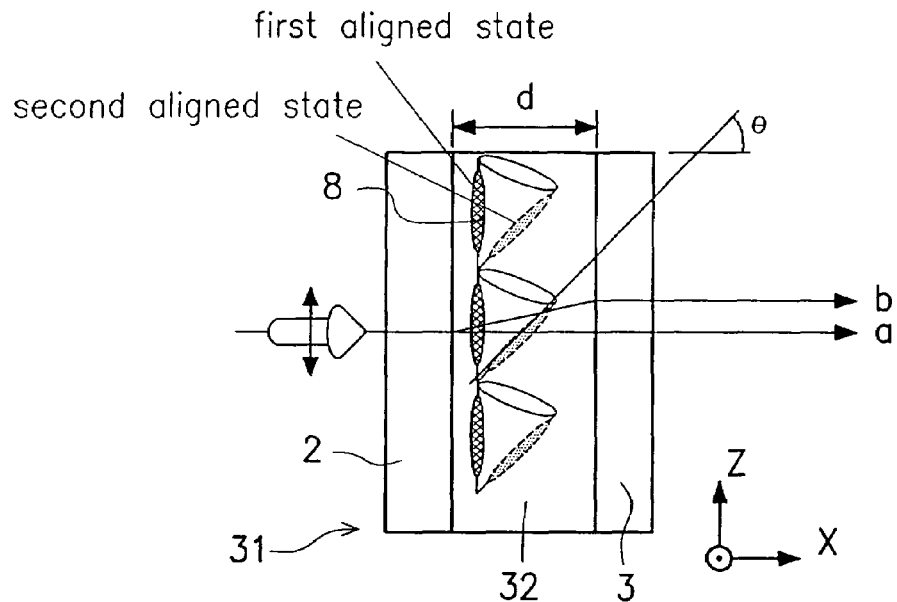
FIG. 11
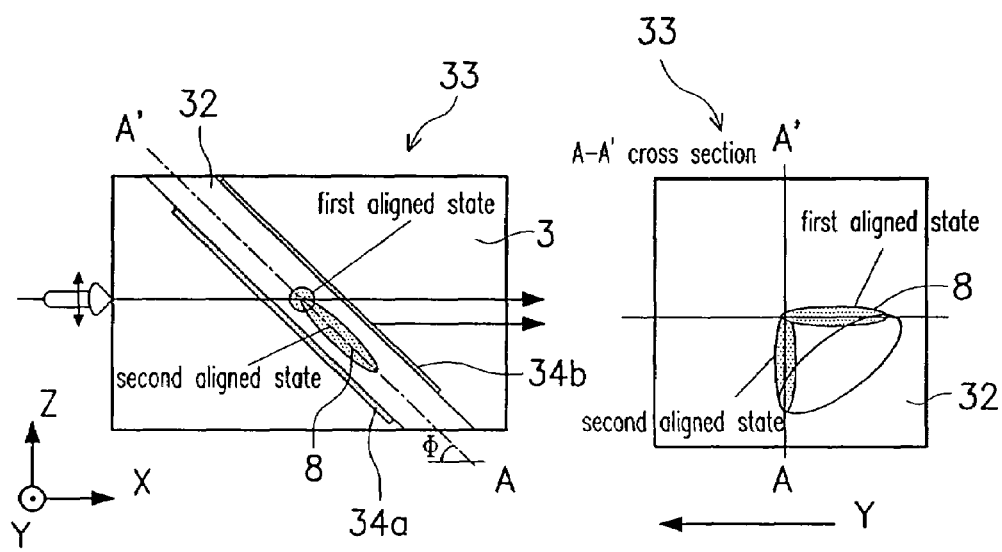
FIG. 12A
FIG. 12B

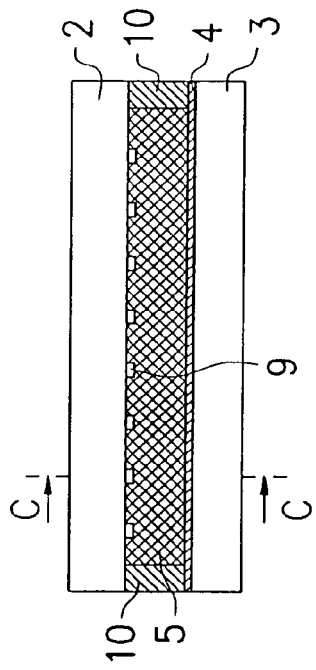
FIG. 16A
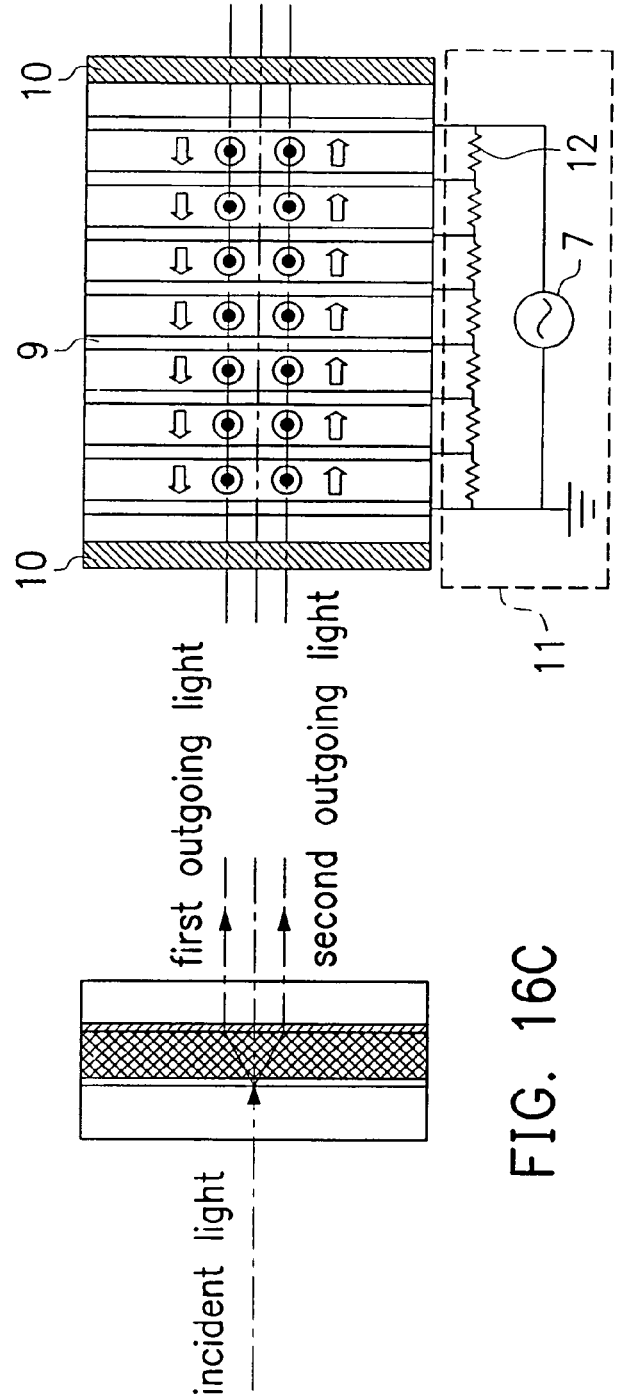
FIG. 16B
FIG. 16C

LIGHT DEFLECTION ELEMENT, LIGHT DEFLECTION DEVICE AND IMAGE DISPLAY DEVICE

CROSS-REFERENCE TO RELATED APPLICATIONS

This application is a continuation of U.S. patent application Ser. No. 10/241,796, filed on Sep. 12, 2002, now U.S. Pat. No. 7,057,700, which is a continuation of U.S. patent application Ser. No. 10/052,368 filed on Jan. 23, 2002, now abandoned, the disclosures of which are incorporated by reference in their entireties. This application also claims the priority benefit of Japanese application serial no. 2001-285409, filed on Sep. 19, 2001 and 2001-287907, filed on Sep. 20, 2001.

BACKGROUND OF THE INVENTION

1. Field of the Invention

This invention relates in general to a light deflection element and light deflection device that are capable of changing the propagation direction of light by electrical signals. More specifically this invention relates to an image display device using the above light deflection element and light deflection device.

2. Description of Related Art

In the specification, a light deflection element is used for deflecting the optical path by electrical signals supplied externally. Namely, with respect to an incident light, an outgoing light is parallel shifted or is rotated by a certain angle. Alternatively, the light deflection element can alter the optical path by combining the above two methods. In the description, regarding the light deflection due to the parallel shift, its magnitude of shift is known as a shift amount; regarding the light deflection due to the rotation, its rotational amount is known as a rotational angle. The light deflection device contains the above light deflection element(s) to deflect the optical path.

A pixel shift comprises an image display element that includes a plurality of pixels arranged in a two dimensional array and is capable of controlling light based upon at least one image information; a light source for illuminating the image display element; an optical device for observing image patterns displayed on the image display element; and a light deflection element and a light deflection apparatus for deflecting the optical path between the optical element and image display element, wherein the image field is divided into a plurality of sub-fields in the time domain by the light deflection apparatus. By the light deflection apparatus, the image patterns are displayed in a state that the display position is shifted according to the deflection of the optical path for each sub-field. The appearance pixel number of the transmission type liquid crystal panel 46 is doubled to be displayed. Therefore, the light deflection element or light deflection device can be used as the light deflection apparatus.

Conventionally, optical devices consisting of the light deflection element are well known as optoelectronic devices that use a material having a large first order electro-optic effect (the Pockels effect) such as $KH_2PO_4$(KDP), $NH_4H_2PO_4$(ADP), $LiNbO_3$, $LiTaO_3$, GaAs, CdTe etc. or a material having a large second order electro-optic effect such as KTN, $SrTiO_3$, $CS_2$, etc. In addition, audio optical devices that use a material of glass, silica etc. are well known (referring to "optoelectronic device", edited by Aoki). In general, a long optical path is necessary for obtaining a very large light deflection and applications are limited because the material is expensive.

On the other hand, there are many proposals related to the optical device that consists of the light deflection element using liquid crystal material. Following descriptions provide several examples briefly.

First, in the Japanese Laid-Open 9-18940, a light beam shifter composed of an artificial birefringence plate is proposed in order to reduce the light loss due to optical spatial switch. According to the disclosure, the light beam shifter is constituted by disposing two sheets of wedged-shaped transparent substrates opposite from each other and holding a liquid crystal layer between the transparent substrates. The light beam shifter is connected with the light beam shifters to the rear surface of a matrix type deflection control element. Two sheets of the wedge-shaped transparent substrates are disposed opposite from each other and, therefore, the light beam shifter with which matrix driving is possible and which is connected in multiple stages with the optical beam shifters holding the liquid crystal layers for shifting incident optical beams by a half cell by shifting the shifters by a half cell each is obtained.

Additionally, in the Japanese Laid Open 9-133904, a light deflection switch, that is capable of obtaining a large deflection, a high deflection efficiency and freely setting a deflection distance and a deflection angle, is disclosed. For example, the liquid crystal element has two transparent substrates that are oppositely arranged by a predetermined spacing, and the opposite surfaces of the transparent substrates are perpendicular. A ferroelectric liquid crystal of smectic A phase is sealed between the two transparent substrates. A pair of electrodes is set such that an AC (alternative current) electric field can be applied perpendicular to the two transparent substrates and parallel to the liquid crystal (smectic layer) layer. In addition, a driving device is used for applying the AC electric field to the electrode pair. Namely, by utilizing the electric tilt effect of the ferroelectric liquid crystal of smectic A phase, the refraction angle of the polarized light incident to the liquid crystal layer and the displacement direction can be changed due to the birefringence of the tilt of the liquid crystal molecules.

According to the Japanese Laid-Open 9-18940, because the nematic liquid crystal is used, it is very difficult to have a response time of a sub-millisecond order, thereby it cannot be an application for a high-speed switching function.

In addition, according to the Japanese Laid Open 9-133904, the ferroelectric smectic A phase liquid crystal is used. However, because the smectic A phase liquid crystal doesn't possess a spontaneous polarization, a high-speed operation cannot be operated.

Next, there are many proposals related to the pixel shift element. Following descriptions provide several examples briefly.

For example, in the Japanese Patent 2939826, a projecting display device for enlarging and projecting an image displayed on a display element onto a screen by an optical projection system. The projecting display device comprises a shifting device and a projecting device. The shifting device further comprises at least one optical element capable of rotating the polarization direction of the transmitted light along the optical path from the display element to the screen, and at least one transparent element possessing a birefringence effect. The projecting device can effectively reduce the aperture and project the projection areas of each image on the display element onto the screen.

According to the disclosure of the previous Japanese patent, the pixel shift is performed by a projection image shifting (pixel shifting) device having at least one transparent element (birefringence element) possessing a birefringence effect and at least one optical element (chiral element) capable of rotating the polarization direction. However, because the chiral element and the birefringence element are used together, there are the following problems for example. The light loss is large and the variation of the pixel shift amount due to the wavelength of the light will reduce the resolution. If the optical properties of the chiral element and the birefringence element are mismatched, optical noise, such as ghosting, occurs because light leakage occurs outside the pixel shift position so that the no image will be formed. In particular, the above problem becomes obvious when the birefringence element uses materials having a large first order electro-optical (Pockels) effect, such as $KH_2PO_4$ (KDP), $NH_4H_2PO_4$(ADP), $LiNbO_3$, $LiTaO_3$, GaAs, and CdTe etc.

Additionally, in the Japanese Laid Open 5-313116, a projector is disclosed. A control circuit samples an image to originally be displayed which is stored in an image storage circuit in a pixel selecting circuit in a checked pattern and displays and projects it on a spatial optical modulator in order. Further, a control circuit controls a panel rocking mechanism corresponding to the display and reproduces the image to originally be displayed by composition hourly while shifting a pitch interval between adjacent image elements of a spatial optical modulator by 1/n times (n: integer). Consequently, the image can be displayed with resolution that is the integral multiple of the image elements of the spatial optical modulator and the projector can be constituted at low cost by using the spatial optical modulator having scattered image elements and a simple optical system.

Also, the Japanese Laid Open 5-313116 discloses a pixel shifting method for shaking the image display element by a distance smaller than the image pitch at a high speed. Regarding this method, because the optical system is fixed, the aberration seldom occurs. However, because the image display element has to be accurately and quickly moved in parallel, the accuracy and the durability required for the movable parts cause problems such as vibration or noise.

In the Japanese Laid Open 6-324320, the apparatus resolution of an image displayed on an image display system is increased without increasing the number of actual pixels which are arranged in horizontal rows and vertical columns and selectively energizable to display an image composed of a plurality of pixel patterns in alternate fields. An optical element is positioned between the image display system and a viewer or screen for shifting an optical path there between to optically shift a pixel pattern. The optical element is operated to shift the optical path, and the pixel pattern to be optically shifted is displayed on the image display system in every field according to the shifting of the optical path by the optical element. In every field of the image information, the portions where the indexes of refraction are different appear alternatively in the optical path between the image display system and a viewer or screen, thereby the optical path is altered.

Also, the Japanese Laid Open 6-324320 describes an apparatus for shifting the optical path that can be a mechanism of a combination of a opto-electronic element and a birefringence material, a lens shifting mechanism, a vary-angle prism, a rotational mirror or a rotational glass etc. In addition to the combination of the opto-electronic element and the birefringence material, the gazette also discloses that the optical element (for example, a lens, a reflecting plate or a birefringent plate) is displaced (parallel moved or tilted) by such as a voice coil or piezoelectric plate to switch the optical path. However, in this method, in order to drive the optical element, the structure becomes complicated and the cost increases.

In addition, according to the Japanese Laid Open 10-133135, a light beam deflection device is disclosed where no rotational mechanical parts are required, thereby a smaller, highly-accurate and high-disassemble device can be made and external vibration is hard to affect the light beam deflection device. According to the disclosure, the light beam deflection device comprises a light-transmissive piezoelectric element arranged in the optical path, transparent electrodes formed on the surface of the light-transmissive piezoelectric element and a voltage applying device for applying a voltage on the light-transmissive piezoelectric element through the transparent electrodes such that the optical axis of the light beam is deflected by changing the length of the optical path between the incidence surface A and projection surface B of the piezoelectric element.

In the previous disclosure, the transparent electrodes sandwich the light-transmissive piezoelectric element and a voltage is applied to the transparent electrodes such that the thickness of the light-transmissive piezoelectric element is changed to shift the optical path. However, a larger light-transmissive piezoelectric element is required and therefore the device cost increases, which has the same problems mentioned in the Japanese Laid Open 6-324320.

In summary, the conventional pixel shift element has the following disadvantages:

(1) Due to its complicated structure, problems, such as the high cost, the enlarged device, the light loss or the optical noise of ghosting etc., occur.

(2) Due to the movable parts, there are problems such as the position accuracy, durability, vibration and noise etc.

(3) Due to the nematic liquid crystal, the response time is slow.

Regarding the response time, the response time for the required light deflection of the pixel shift in the image display device can be estimated as follows. An image field is divided into n in the time domain (time $t_{Field}$). If the optical path between the image display device and the optical element is deflected in every n sub-field to fix the shifting position of the pixel shift at n points, the time for one sub-field can be expressed by $t_{SF}=t_{Field}/n$. The light deflection is performed in the interval of time $t_{SF}$. When the time is $t_{shift}$, there is no display in the interval of time $t_{shift}$. Therefore, the utility efficiency of the light becomes lower in this time interval.

The utility efficiency of the light E can be expressed by $E=(t_{SF}-t_{shift})/t_{SF}$. Assuming the pixel shift position n is n=4 and the image field $t_{Field}$ is 16.7 ms, in order to maintain the utility efficiency of the light E above 90%, $t_{shift}$ can be calculated from $0.9<(16.7/4-t_{shift})/(16.7/4)$. As a result, $t_{shift}$ satisfies $t_{shift}<0.42$ (ms). Namely, the light deflection has to be 42 ms. However, because the response time for a nematic liquid crystal is several milliseconds, the conventional technology cannot apply to the optical device for high-speed pixel shift.

In the Japanese Laid Open 6-18940, because the nematic liquid crystal material is used, it is very difficult to have a response time of a sub-millisecond order, thereby it cannot be an application for a pixel shift device. However, the response time of a ferroelectric chiral smectic C phase liquid crystal can be set under 0.42 ms.

In addition, according to the Japanese Laid Open 9-133904, the ferroelectric smectic A phase liquid crystal is used. However, because the smectic A phase liquid crystal doesn't possess a spontaneous polarization, the high-speed operation that a chiral smectic C phase liquid crystal can provide can hardly be expected.

SUMMARY OF THE INVENTION

According to the foregoing descriptions, an object of this invention is to provide a light deflection element, a light deflection device and an image display device using the light deflection element or device for improving the conventional problems due to its complicated structure, such as high cost, enlarged device, light loss and optical noise etc. According to the invention, the structure is simple and small, thereby the light loss, the optical noise and the cost are reduced without decreasing the resolution.

Another object of this invention is to provide a light deflection element and light deflection device in order to improve problems of low position accuracy, bad durability, vibration or noise in the conventional model due to the existence of a movable part.

Another object of this invention is to provide a light deflection element, a light deflection device and an image display device using the light deflection element or device having a high response time. Therefore, the invention improves the conventional problem of slow response time due to the smectic A phase or nematic liquid crystal used in the optical device for changing the optical path.

To achieve the foregoing objects, the invention provides a light deflection element capable of generating an electric field such that the optical path can be effectively switched. Furthermore, the light loss can be also significantly reduced.

To achieve the foregoing objects, the invention provides a light deflection element, wherein a voltage applied by an electric field applying device can be reduced and therefore a power source can become smaller and compact. Accordingly, the cost can be further reduced.

To achieve the foregoing objects, the invention provides a light deflection element having an electric field applying device such that an electric field can be generated in the liquid crystal for efficiently activating the liquid crystal.

To achieve the foregoing objects, the invention provides a light deflection element that is smaller and low-cost, by which an electric field can be generated to effectively switch the optical path in at least three direction by one light deflection element.

To achieve the foregoing objects, the invention provides a light deflection device capable of reducing the optical noise and achieving excellent light shift.

To achieve the foregoing objects, the invention provides a light deflection device capable of freely controlling the light deflection amount.

To achieve the foregoing objects, the invention provides a light deflection element such that the unevenness at the location of the light deflection in the element can be reduced. Therefore, the optical noise can be significantly reduced.

To achieve the foregoing objects, the invention provides a light deflection element such that the outgoing light possesses a certain angle relative to the incident light and then is rotated, by which the optical path can be switched. Therefore, the response time can be improved.

Conventionally, in order to obtain a large shift amount, a liquid crystal material having a large refraction index difference between normal light and abnormal light is used or the thickness of the liquid crystal has to be increased. In practice, the refraction index of the above liquid crystal material has a large dependence on the wavelength, i.e., aberration occurs easily. In addition, even if the thickness of the liquid crystal is increased and the liquid crystal is uniformly aligned, there is limitation for performing a high-speed operation. To achieve the foregoing objects, the invention provides a light deflection device capable of obtaining any shifting amount without losing the response time.

In addition, it is an object of the invention to provide an image display device using the pixel shift, by which a bright and high quality image can be displayed to a viewer. Furthermore, the utility rate of light is increased without increasing the loading of the light source.

The invention provides a light deflection element, which comprises a pair of transparent substrates; a liquid crystal composed of a chiral smectic C phase material with a homeotropic alignment, being filled between the pair of transparent substrates; and at least an electric field applying device, for activating an electric field in the liquid crystal.

Therefore, since a chiral smectic C phase liquid crystal is used, the problems of the conventional light deflection element, such as high cost, light loss, large size, and optical noise etc. due to its complicated structure, can be greatly improved. In addition, because of no movable parts, the problems of the conventional light deflection element, such as low position accuracy, worse durability, vibration, and noise etc due to its movable parts, can be avoided. Furthermore, the invention also improves the conventional low response time because the conventional light deflection element uses the smectic A phase liquid crystal or the nematic liquid crystal, thereby high-speed response is possible. In addition, because the liquid crystal directors have homeotropic alignment with respect to the substrate, a stable shifting amount and rotational angle can be obtained by a low electric field. The operation of the liquid crystal directors are hardly affected by the restricting force from the substrate. The direction of the light deflection can be easily adjusted by adjusting the direction of the external electric field such that the setting margin of the optical element increases. Moreover, because the alignment states of the liquid crystal directors with respect to the direction of the electric field is easy, the unevenness of the light strength in the deflection direction hardly occurs.

In addition, the foregoing electric field applying device is located at a position without overlapping an optical path of the light deflection element, and has electrode pairs for generating the electric field that are substantially perpendicular to a light deflection direction and a normal direction of the liquid crystal composed of a chiral smectic C phase material. In the invention, the "optical path" means a portion from the front to the rear of the light deflection element, through which the light actually passes.

When the electric field is applied in a direction that is not perpendicular to the light deflection direction, the light deflection positions have a gap or a large electric field is required in order to obtain a demanded shifting amount or rotational amount. When the electric field is applied in a direction that is not perpendicular to the normal line of the liquid crystal layer, in addition to the above problems, the component of the first optical path that is deflected by the electric field applied in a certain direction and the component of the second optical path that is not deflected or deflected by the electric field applied in another direction are mixed, by which the optical noise increases. However, according to the invention, the above problems can be improved and the optical path can be efficiently switched. In comparison with the conventional light deflection element, the light loss can be reduced.

The invention further provides a light deflection device, which comprises two light deflection elements mentioned above that are arranged in series in the direction of the light propagation. Each of the light deflection elements has an electrode pair such that the directions of the electric fields generated by the electrode pairs are perpendicular. Additionally, a ½ wavelength plate is interposed between the two light deflection elements Therefore, by combining the above two light deflection elements and the ½ wavelength plate, the light can be shifted to four directions such as up, down and left, and right direction.

The invention further provides a light deflection device, which comprises the light deflection element mentioned above and a polarization direction switching device for controlling the polarization direction of the incident light incident to the light deflection element.

Therefore, because the light deflection element having two sets of perpendicular electrode pairs is provided, the light can be shifted in four directions, up, down, left and right direction. In particular, because only one light deflection element is used, the size can become smaller, the cost and the light loss can be reduced too.

Alternatively, the electric field applying device can have one set of electrode pairs and be arranged between the transparent substrates.

Therefore, regarding the electric field applying device of the light deflection element, a voltage to generate an electric field by the electric field applying device can be reduced, thereby the power source can become smaller and the cost reduced.

In addition, the electrode pairs mentioned above can be interleaved and arranged in a comb-teeth shape.

Therefore, regarding the electric field applying device of the light deflection element, because the electric field generated by the electric field applying device can be applied to the liquid crystal more efficiently, thereby the power source can become smaller and the cost reduced.

Alternatively, the electric field applying device has two sets of comb-teeth shape electrode pairs formed at interfaces between the liquid crystal and the transparent substrates, and the directions of electric fields generated by the two sets of comb-teeth shape electrode pairs are opposite.

Therefore, it is possible to effectively switch the optical path in at least three directions by one light deflection element.

The invention further provides a light deflection device, which comprises a light deflection element having a configuration as described above, and a polarization direction switching device. The polarization direction switching device is arranged at an incident side of the light deflection element for controlling a polarization direction of an incident light such that the polarization direction of the incident light is aligned with a light deflection direction occurred by the light deflection element.

Therefore, the mixture probability, between a first component on a first optical path that is deflected by the applied electric field in a certain direction and a second component on a second optical path that is not deflected or deflected by the applied electric field in a different direction, can be greatly reduced. Thus, the optical noise becomes small and excellent light shift can be achieved.

The invention further provides a light deflection device, which comprises a light deflection element having a configuration as described above and a polarization direction switching device, arranged at an incident side of the light deflection element for controlling a polarization direction of an incident light such that the polarization direction of the incident light is rotated by a predetermined angle relative to a light deflection direction caused by the light deflection element.

Therefore, the ratio of the first component on the first optical path that is deflected by the applied electric field in a certain direction and the second component on the second optical path that is not deflected or deflected by the applied electric field in a different direction can be set on demand. Accordingly, the light deflection amount can be freely controlled.

The invention further provides a light deflection element, which comprises a pair of transparent substrates; a liquid crystal composed of a chiral smectic C phase material with a homogeneous alignment, being filled between the pair of transparent substrates; and at least a electric field applying device located at a position without overlapping a optical path of the light deflection element, and has an electrode pair for generating the electric field that is substantially perpendicular to a light deflection direction and a normal direction of the liquid crystal composed of a chiral smectic C phase material.

Therefore, by using the chiral smectic C phase liquid crystal, the invention can achieve the effects described in the embodiments. In particular, because the chiral smectic C phase liquid crystal with a homogeneous alignment is used, the unevenness at the location where light deflection occurs within the element can be reduced as much as possible, thereby the optical noise can be further decreased.

The invention further provides a light deflection element, which comprises a pair of transparent substrates; a liquid crystal composed of a chiral smectic C phase material with a homogeneous alignment, being filled between the pair of transparent substrates; and at least an electric field applying device, having electrode pairs formed between the liquid crystal and the transparent substrates, wherein a direction of an incident light is different from a normal direction of the transparent substrate.

Therefore, by using the chiral smectic C phase liquid crystal, the invention can achieve the effects described in the embodiments. Because the chiral smectic C phase liquid crystal with a homogeneous alignment is used, the unevenness at the location where light deflection occurs within the element can be reduced as possible, thereby the optical noise can be further decreased. Furthermore, transparent electrodes made of ITO etc. are preferred for the electric field applying device, i.e., a whole film can be used as the electrodes, thereby the electrodes can be formed easily. Because it is not necessary to pattern the electrodes, no interference, such as the moiré, occurs to interfere with the light propagation. In addition, in comparison with that of the electric field generated by the external electrodes, the invention doesn't require a high voltage source, thereby the device size can be decreased.

The invention further provides a light deflection element, which comprises a pair of transparent substrates; a liquid crystal composed of a chiral smectic C phase material, being filled between the pair of transparent substrates; and at least an electric field applying device, wherein surfaces of the transparent substrates sandwiching the liquid crystal are opposite and tilted with respect to a light deflection direction.

Therefore, by using the chiral smectic C phase liquid crystal, the invention can achieve the effects described in the embodiments. The outgoing light possesses a certain angle with respect to the incident light and can be rotated so that the optical path can be switched, thereby the response time can be improved.

The invention further provides a light deflection device, comprising: a first and a second light deflection element that are separated by a predetermined distance along a light propagating direction. Each of the first and the second light deflection elements further comprises a pair of transparent substrates; a liquid crystal composed of a chiral smectic C phase material, being filled between the pair of transparent substrates; and at least an electric field applying device, wherein surfaces of the transparent substrates sandwiching the liquid crystal are opposite and tilted with respect to a light deflection direction.

Therefore, any deflection amount can be obtained by properly choosing a distance between the light deflect element and the light receiving portion without sacrificing the response time.

Additionally, each configuration of the above light deflection elements can further comprise a light deflection position controlling device for controlling a light deflection position by performing a temperature control to the light deflection element and the direction of the electric field generated by the electrode pair.

Therefore, the inclined angle can be controlled by temperature, and the light deflection can also be controlled. Additionally, regarding the position control, a suitable light deflection can be achieved by fine-tuning the electric field.

The invention further provides an image display device, comprising an image display element, comprising a plurality of pixels that are arranged in a two dimensional array, capable of controlling a light according to an image information; a light source for illuminating the image display element; an optical element for observing image patterns displayed on the image display element; and a light deflection element for deflecting an optical path between the image display element and the optical element for each of the sub-fields, wherein the sub-fields are divided in time domain from an image field. The light deflection element can have the configurations or structures mentioned above.

Therefore, by the light deflection element, the image patterns are displayed in a state that the display position is shifted according to the deflection of the optical path for each sub-field. Therefore, the appearance pixel number of the transmission type liquid crystal panel 46 is doubled to that displayed. Because the light deflection device composed of the pixel shift element utilizes the various embodiments of the invention, the light utility rate can increase and a bright and high-quality image can be provided to the viewer without increasing the loading of the light source. In particular, when the light deflection element 1 in the fifth embodiment is used, a suitable pixel-shifting amount can be maintained and a good image can be obtained by performing temperature control to the light deflection element and direction control of the electric field applied by the electrode pair of the light deflection element.

The invention further provides a light deflection device, comprising a light path deflection element and a voltage applying device. The light path deflection element further comprises a pair of transparent substrates; an alignment layer, between the substrates for homeotropically aligning liquid crystal molecules therebetween; a liquid crystal layer, forming in a chiral smectic C phase without existence of electric field; at least two spacers, for limiting a thickness of the liquid crystal layer between the substrates; at least two electrodes, for creating an electric field substantially parallel to the liquid crystal layer; a plurality of electrode lines, substantially arranged parallel to a desired light path shift direction on regions containing light paths on at least one of the substrates. The voltage applying device is capable of switching direction of the electric field between the substrates. In this way, by switching the direction of the applied electric field, and a light path of a transmitted light through the light deflection device is deflected to a direction substantially perpendicular to both a normal direction of the liquid crystal layer and the direction of the electric field. The voltage applying device is set to apply stepwise different voltage values to the electrode lines at a specific time. Therefore, even though the effective cross-sectional area of the light path is large, the entire light path can be more uniform deflected.

In addition, the above light path deflection element comprises a plurality of electrode lines that are substantially arranged parallel to a desired light path shift direction on regions containing light paths on the two substrates. Therefore, even though the effective cross-sectional area of the light path is large, the entire light path can be more uniform and effectively deflected.

The above electrode lines can be made of transparent electrode material, as seeing from the light paths, the electrode lines on each substrate are interleavedly arranged, and at a specific time, voltage values applied to the electrode lines are interleavedly and stepwise different values between the two substrates. Therefore, even though the effective cross-sectional area of the light path is large, the uniformity of the deflection amount of the entire light path can be further increased.

Furthermore, the spacers can be an electrode pair made of conductive material and located outside light path regions, the electrode lines are formed between the electrode pair with respect to the plane direction of the light path deflection element. At a specific time, the voltage applying device applies one electrode of the electrode pair with a voltage value equal or larger than the maximum voltage value applied to the electrode lines, and applies the other electrode of the electrode pair with a voltage value equal or smaller than the minimum voltage value applied to the electrode lines. In this way, even though the effective cross-sectional area of the light path is large, the entire light path can be more uniform deflected.

A dielectric layer can be further formed on a surface of the substrate that the electrode lines are formed thereon, and the alignment layer is formed between the dielectric layer and the liquid crystal layer. The electrode lines on each substrate are interleavedly arranged. In this way, even though the effective cross-sectional area of the light path is large, the strength of the electric field in the plane direction within the liquid crystal layer can be uniform, and therefore, a uniform deflection effect of the light path can be obtained.

The invention further provides a light deflection device, comprising a light deflection element and an electric field applying device. The light deflection element includes a pair of transparent substrates, a separating means for forming a separation between the transparent substrates, a liquid crystal layer, capable of forming a chiral smectic C phase that is constrained between the transparent substrates, a vertical alignment layer formed on an inner surface of at least one of the transparent substrates, and at least two electrodes, arranged to be capable of applying an electric field that is substantially parallel to the liquid crystal layer. The electric field applying device is used for applying a voltage across the electrodes of the light deflection element. In this configuration, the average inclined direction of the optical axis of the liquid crystal is varied according to a strength and a direction of the electric field created by the electric field applying device, so that a transmitting light path of a linear polarized light is deflected. Additionally, as the electric field created by the electric field applying device increases, a strength of the electric field that the shift amount of the light path becomes about saturated is set as a saturated electric field Es, and when the light path is deflected, an out of the electric field applying device is set so that the strength of the electric field is above Es.

BRIEF DESCRIPTION OF THE DRAWINGS

While the specification concludes with claims particularly pointing out and distinctly claiming the subject matter which is regarded as the invention, the objects and features of the invention and further objects, features and advantages thereof will be better understood from the following description taken in connection with the accompanying drawings in which:

FIG. 3A is a cross-sectional view for showing a relationship between the light deflection and the liquid crystal directors;

FIG. 3B shows aligned states of the liquid crystal director;

FIG. 4 is a graph for showing the relationship of the axis shifting amount versus the thickness and the alignment angle of the liquid crystal;

FIGS. 9A and 9B schematically show a cross-sectional view of a light deflection element for describing its operation according to the sixth embodiment of the invention, in which FIG. 9A is a cross-sectional view along the X-Z plane and FIG. 9B is a cross-sectional view along the Y-Z plane;

FIGS. 10A and 10B schematically show a cross-sectional view of a light deflection element for describing its operation according to the seventh embodiment of the invention, in which FIG. 10A is a cross-sectional view along the X-Z plane and FIG. 10B is a cross-sectional view along the Y-Z plane;

FIG. 11 schematically shows a cross-sectional view of a light deflection element for describing its operation according to the eighth embodiment of the invention;

FIGS. 12A and 12B schematically show a cross-sectional view of a light deflection element for describing its operation according to the ninth embodiment of the invention, in which FIG. 12A is a cross-sectional view along the X-Z plane and FIG. 12B is a cross-sectional view along the A-A' line in FIG. 12A;

FIGS. 16A-16C are diagrams for describing one embodiment of the invention;

DESCRIPTION OF THE PREFERRED EMBODIMENT

First Embodiment

Figure 1:
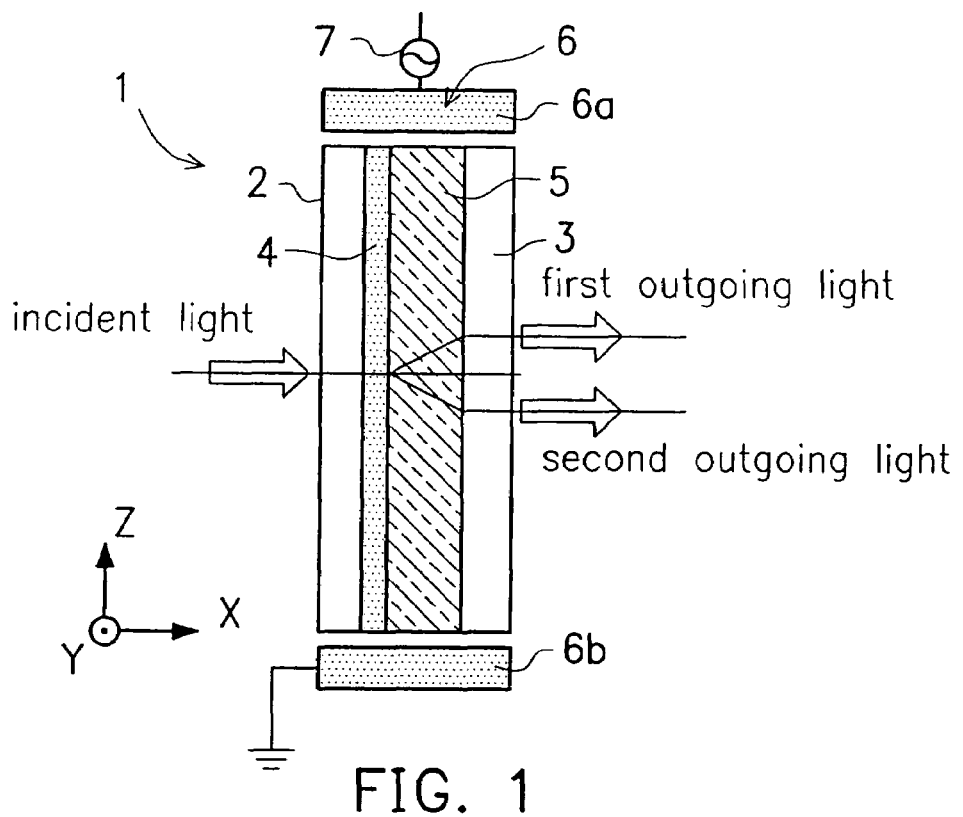
FIG. 1 schematically shows a cross-sectional view of a light deflection element for describing its operation according to the first embodiment of the invention.

The first preferred embodiment according to the invention is described in detail with reference to FIGS. 1 to 4. FIG. 1 schematically illustrates a cross-sectional view of the structure of an optical deflecting element according to the first preferred embodiment of the invention. The optical deflecting element 1 is arranged to have a pair of transparent substrates 2, 3 that are opposite to each other. An alignment layer 4 is formed on the inner surface of one of the transparent substrates 2, 3 (here the transparent substrate 2). A ferroelectric liquid crystal (LC) 5 composed of chiral smectic C phase materials is filled between the alignment layer 4 and the other transparent substrate 3.

An electrode pair 6 consisting of electrodes 6a, 6b used for corresponding the deflecting directions of light is arranged in the above structure having the pair of transparent substrates 2, 3, the alignment layer 4 and the ferroelectric LC 5, and is connected to a power source 7. Because the electrode pair 6 is used for applying an electric field, the electrode pair 6 is arranged to point to an electric vector at a location without overlapping the optical path and is substantially perpendicular to the rotational axis of the liquid crystal of the optical deflecting element 1. The transparent substrates 2, 3 can be integrally or separately arranged. In addition, the electrode pair 6 can be also used as a spacer for defining a thickness of the liquid crystal 5.

As shown in FIG. 1, an incident light is deflected by the direction of the electric field formed by the electrode pair 6 and then transmitted along an optical path consisting of a first outgoing light or a second outgoing light.

The "smectic liquid crystal" is a liquid crystal with a particular phase that the liquid crystal molecules generally form in layers along its long axis direction. In regard to the smectic liquid crystal, a smectic A phase liquid crystal is a liquid crystal where the normal direction of the layers is consistent with the long axis direction of the liquid crystal and a chiral smectic C phase liquid crystal is a liquid crystal that the normal direction of the layers is not consistent with the direction of the long axis of the liquid crystal. In general, when the external electric field is not applied to the liquid crystal, the direction of the liquid crystal directors in each layer is spirally rotated, i.e., a spiral structure. Regarding the chiral smectic C phase anti-ferroelectric liquid crystal, the direction of the liquid crystal directors in each layer is opposite. The chiral smectic C phase liquid crystal contains chiral carbon that will induce spontaneous polarization. Accordingly, the optical property of the liquid crystal can be controlled because the liquid crystal molecules are re-aligned in a fixed direction by the spontaneous polarization and the external electric field E. In the embodiment, the liquid crystal 5 of the light deflection element 1 uses the ferroelectric liquid crystal as an example for description, but the anti-ferroelectric liquid crystal can also be used.

The structure of the ferroelectric liquid crystal made of the chiral smectic C phase material is composed of a main chain, a spacer, a backbone, a bond portion and a chiral portion. The main chain structure can use polyacrylate, polymethacrylate, polysiloxane, polyoxyethylene etc. The spacer is used for combining the backbone that is used for rotating the molecules, the bond portion and the chiral portion with the main chain, and a methylene chain etc. with a suitable length can be chosen as the spacer. In addition, a —COO— etc. can be chosen as the bond portion for bonding the chiral portion and the tough backbone with a biphenyl group etc.

In the ferroelectric liquid crystal 5 made of the chiral smectic C phase material, the rotational axis of the spiral rotation of the molecules is perpendicular to the substrates 2, 3 by the alignment layer 4, which is also known as a homeotropic alignment. The conventional method can be used as the alignment method for the homeotropic alignment, such as a shear stress method, a magnetic field alignment method, a temperature gradient method, a SiO gradient evaporation and optical alignment method, etc. (referring to pp. 235, "Structure and Property of Ferroelectric Liquid Crystal" by Takezoe and Fukuda, Corona publisher).

According to one of the features of the first embodiment of the invention, because it is not necessary to form an electrode pattern from ITO film etc within the optical deflecting element 1, there is no light loss and the layer structure for penetrating light of the optical deflecting element 1 is simple, thereby the manufacturing cost can be reduced. Moreover, in comparison with the smectic A phase or nematic liquid crystal, the chiral smectic C phase liquid crystal has a very high speed response time, which may be switched within sub-millisecond. In particular, because the direction of the director with respect to the electric field can be determined, the direction of the director can be easily controlled and handled in comparison with the smectic A phase liquid crystal.

Regarding the chiral smectic C phase liquid crystal 5 with the homeotropic alignment, the operation of the liquid crystal directors is not easily affected by the control from the substrates 2, 3, and the light deflection direction can be easily controlled by adjusting the external electric filed. Therefore, it is advantageous that the required electric field can be lower. Additionally, when the liquid crystal directors is an homogeneous alignment, because the liquid crystal directors strongly depend on not only the direction of the electric field, but also the substrates, the more position accuracy is required for setting the light deflection element 1. In contrast, because of the homeotropic alignment of the embodiment, the setting margin of the light deflection element 1 for the light deflection increases. When utilizing the above feature, the rotational axis is not necessary to be rigorously perpendicular to the substrates 2, 3 and can be slightly tilted from the substrates 2, 3, even though being slightly tilted. For example, even though a portion of the side forming the spiral structure is perpendicular to the substrates 2, 3 and the spiral axis is tilted from the normal of the substrates 2, 3, the liquid crystal directors can still be directed to two directions without being affected by the control from the substrates 2, 3.

Figure 2:
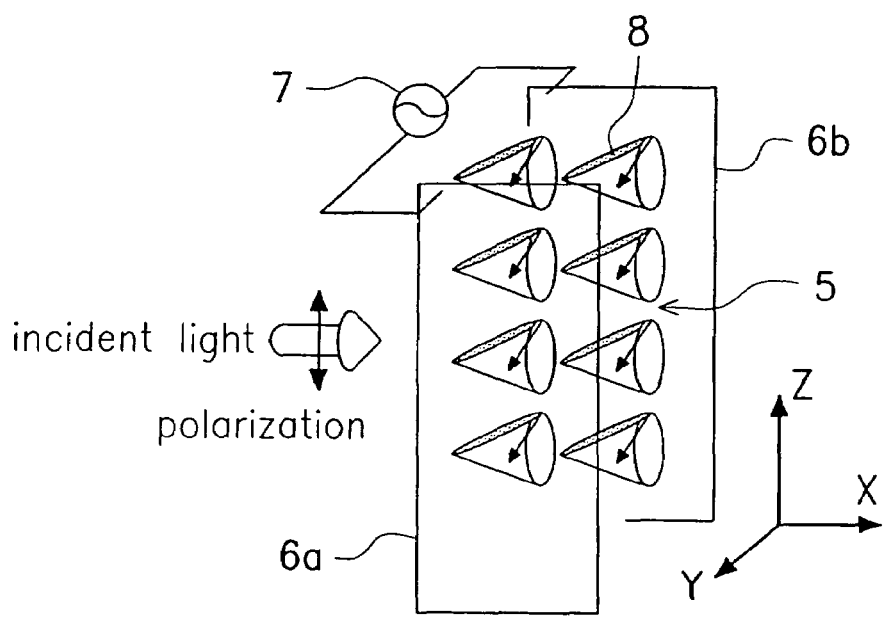
FIG. 2 schematically shows a perspective view of alignment modes of the liquid crystal in the light deflection element of FIG. 1 for describing its operation.

The principle for operating the light deflection element 1 of the embodiment is described with reference to FIGS. 2 and 3. FIG. 2 schematically shows the alignment of the liquid crystal concerning the structure shown in FIG. 1. In FIG. 1, the electric field is applied from the top to the bottom. However, for convenience, in FIG. 2, the electric field is applied from the outside to the inside, and thus the electric field occurs from the outside to the inside. In addition, the direction of the electric field can be switched by the power source 7 to correspond the light deflection direction. The electrodes 6a, 6b shown in FIG. 2 can be formed integrally together with, or separated from the substrates 2, 3.

The incident light to the light deflection element 1 is a linear polarization light whose polarization direction is up and down as shown by the arrows in FIG. 2. Similarly, the polarization direction is depicted by an up-and-down or a left-and-right arrow that overlaps the symbol of the incident light. The electrodes 6a, 6b are oppositely arranged in a manner where the electric field is perpendicular to the polarization direction of the incident light. Furthermore, a spacer for defining the film thickness of the liquid crystal 5 can also serve as the electrodes. However, no matter what situation, it is better to form an electromagnetic shield for preventing the light deflection element 1 from being adversely affected due to the leakage electric field from the electrodes 6a, 6b.

When a coordinate system of X-Y-Z show in FIG. 2 is used, FIG. 3A shows a cross-sectional view of the directors 8 in the X-Z plane of the liquid crystal 5. According to the direction of the electric field, the directors 8 can be in the first aligned state or a second aligned state as shown in FIG. 3B. An angle θ is defined as an inclined angle between the rotational angle of the liquid crystal and the director, which will be referred to as the inclined angle hereinafter. When the spontaneous polarization PS of the liquid crystal 5 is positive and the electric field E is along the positive direction of the Y axis (upward with respect to the drawing), the liquid crystal directors 8 are on the X-Z plane so that the rotational axis of the liquid crystal can be substantially perpendicular to the substrates 2, 3. Assuming that the index of refraction along the long axis of the liquid crystal is ne and the index of refraction along the short axis of the liquid crystal is no, the incident light is linearly polarized in the Y axis direction and propagates along the positive X axis direction. In the liquid crystal, the light is a normal light and propagates straightly due to the index of refraction no, i.e., propagates along the "a" direction in FIG. 3. Namely, no light deflection occurs.

When an incident light is linearly polarized with a polarization direction along the Z axis, the index of refraction in the incident direction can be calculated from the direction of the liquid crystal director 8 and the indexes of refraction ne, no. More clearly, in an index ellipsoid with principal axes of indexes of refraction ne, no, the index of refraction in the incident direction can be calculated from a relationship with the light direction passing through the center of the ellipsoid. The light is deflected according to the indexes of refraction ne, no and the direction of the liquid crystal director 8 (the inclined angle θ). As shown in FIG. 3A, the light is shifted to the direction b when the liquid crystal is in the first aligned state.

Assuming that the thickness (cap) of the liquid crystal 5 is d, the shift amount S can be expressed by the following equation (1), referring to "Crystal Optics", page 198, published by Applied Physics Association (Japan).

$$S = \frac{\left(\frac{1}{no}\right)^2 - \left(\frac{1}{ne}\right)^2 \sin(2\theta \cdot d)}{2\left\{\left(\frac{1}{ne}\right)^2 \sin^2\theta + \left(\frac{1}{no}\right)^2 \cos^2\theta\right\}} \quad (1)$$

When the direction of the electric field E is reversed, the director 8 reaches a position (the second aligned state) that is linearly symmetric to the first aligned state with respect to the X axis.

Therefore, the linearly polarized light can have two deflection positions b and b' (i.e. a deflection amount of 2S) by controlling the direction of the electric field to activate the liquid crystal 5.

FIG. 4 shows calculated results of the light deflection (shift amount) S that is obtained according to the typical physical parameters (no=1.6, ne=1.8) of the material of the liquid crystal 5. The light deflection S reaches its maximum around θ=45°. From FIG. 4, when the inclined angle θ of the director is 22.5°, it is better to set the thickness of the liquid crystal 5 to 32 μm in order to obtain a light deflection of 2S=5 μm. In addition, regarding the ferroelectric liquid crystal with the homeotropic alignment, a response time of 0.1 ms to an electric field of about 700 V/cm is reported (referring to Ozak, et al., J. J. Appl. Physics, Vol. 30, No. 9B, pp 2366-2369 (1991)), and therefore, a very fast response time of sub-millisecond order can be obtained.

In the liquid crystal composed of chiral smectic C phase materials, the inclined angle θ varies with the temperature T. Assuming $T_C$ is the temperature at the phase transient point, the relationship between the inclined angle θ and the temperature T is $\theta \propto (T-T_C)^\beta$, in which β depends on the material used and is about 0.5. Accordingly, the light deflection can be controlled by the temperature control using the above property.

For example, assuming that the inclined angle θ is set to the aforementioned 22.5° and the corresponding temperature is $T_\theta$=22.5°, because θ<22.5° when T>$T_\theta$=22.5° and θ>22.5° when T<$T_\theta$=22.5°, the variation of the inclined angle θ due to the temperature can be controlled. Accordingly, light deflection can be controlled. In addition, the position control can be similarly executed by fine tuning the electric field, and therefore the light can be properly deflected by combining the temperature, the electric field or both of them.

The temperature control of the liquid crystal can be a feedback control so that the temperature of the light deflection element 1 is monitored to activate a heating source or a cooling source for decreasing the difference between a preset temperature and the temperature of the light deflection element 1. In addition, by a variation of the monitoring of the temperature, the light deflection can be monitored to activate the heating source or the cooling source to reduce the difference between a normal position and the monitored light deflection.

The heating source can be arranged outside the optical deflecting element 1. However, as described in the following embodiments, in order to downsize the light deflection element 1, it is preferred to utilize a Joule heat that is generated from a current flowing through a resistant line formed in the light deflection element 1. In regard to the cooling source, a Peltier element etc. is preferred for example.

Second Embodiment

The second embodiment of the invention is described in detail with reference to FIG. 5. Elements that are as same as or equivalent to the elements of the first embodiment are labeled by the same numerals, and their corresponding descriptions are omitted, which is similar to the following embodiments.

The second embodiment describes a light deflection device 10 having a structure combing two light deflection elements 1A, 1B mentioned above and a ½ wavelength plate 9. As shown in FIG. 5, the two light deflection elements 1A, 1B are respectively perpendicular to the directions of the electric fields generated by electrode pairs 6 (6a, 6b) and are arranged in series along the propagation direction of light. The ½ wavelength plate 9 is interposed between the light deflection elements 1A, 1B. The directions of electric fields generated by two electrode pairs forms a predetermined angle, for example 90 degrees.

According to the light deflection device 10, because the light shift (deflection) are in two directions of the up and down directions (along the Z axis) in the light deflection element 1A and the light shift (deflection) are in two directions of the left and right directions (along the Y axis) in the light deflection element 1B, the light deflection device can deflect the light to four directions.

The ½ wavelength plate 9 can use the commercial product directly. As shown in FIG. 5, the light incident to the light deflection device 10 is polarized in the Z axis direction, and is deflected towards the up and down directions (along Z axis) at the fore portion of the light deflection device 10 with respect to the light propagation direction. Afterwards, the polarization of the light is rotated by 90° because of the ½ wavelength plate 9 being polarized in the Y axis direction, and then is deflected towards the left and right directions (along Y axis) at the rear portion of the light deflection device 10.

Third Embodiment

The third embodiment of the invention is described in detail with reference to FIG. 6. According to the third embodiment, in addition to the electrode pair 6, an electrode pair 11, consisting of electrodes 11a, 11b and serving as an electric field applying device for creating an electric field perpendicular to the electrode pair 6, is added to the light deflection element 1 mentioned above. A power source 12 is connected between of the electrodes 11a, 11b of the electrode pair 11. On the other hand, the electrode pairs 6, 11 are arranged in the up/down and the left/right directions with respect to the liquid crystal 5. A polarization direction switching device or a polarization direction switching device 13 is provided for controlling the deflection direction of the incident light at the incident side of the light deflection element 1 that has the electrode pairs 6, 11 above.

Figure 5:
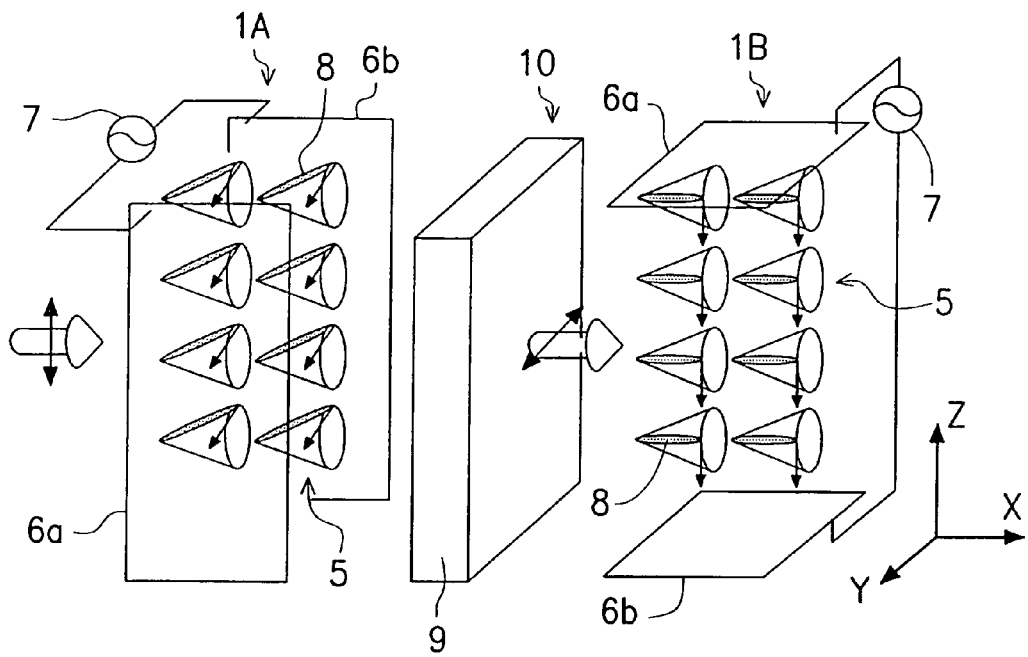
FIG. 5 schematically shows a perspective view of a light deflection device by combining light deflection elements according to the second embodiment of the invention.

According to the above structure, the light deflection positions are the same as the situation in FIG. 5, which are four positions: up, down, left and right. The above situation is set in two directions of up-to-down and left-to-right corresponding to the direction of polarization set by the polarization direction switching device 13. In this situation, the polarization direction switching device 13 can be composed of the ferroelectric liquid crystal material. In addition, regarding a multi-direction (greater than four) consideration, the polarization direction switching device 13 can be a faraday rotation element. In any situation, the polarization direction is controlled such that the polarization direction of the incident light and the light deflection direction in the light deflection element 1 are consistent, thereby the optical noise can be reduced and an excellent light shift can be achieved.

According to the light deflection device 14 of the third embodiment, in comparison with the light deflection device 10 in FIG. 5, the same function can be achieved by using only one light deflection element 1. Therefore, the system can become smaller and compact, the cost is reduced and the light loss can be minimized. However, if the light deflection positions are limited to only two positions, the structure in FIG. 6 can only use one electrode pair (similar to FIG. 2).

According to embodiments described in the following paragraphs, in an image display device for projecting an image formed on a liquid crystal panel, because the polarization direction of the liquid crystal panel can be rotated for each image, the polarization direction switching device 13 can be omitted.

Figure 6:
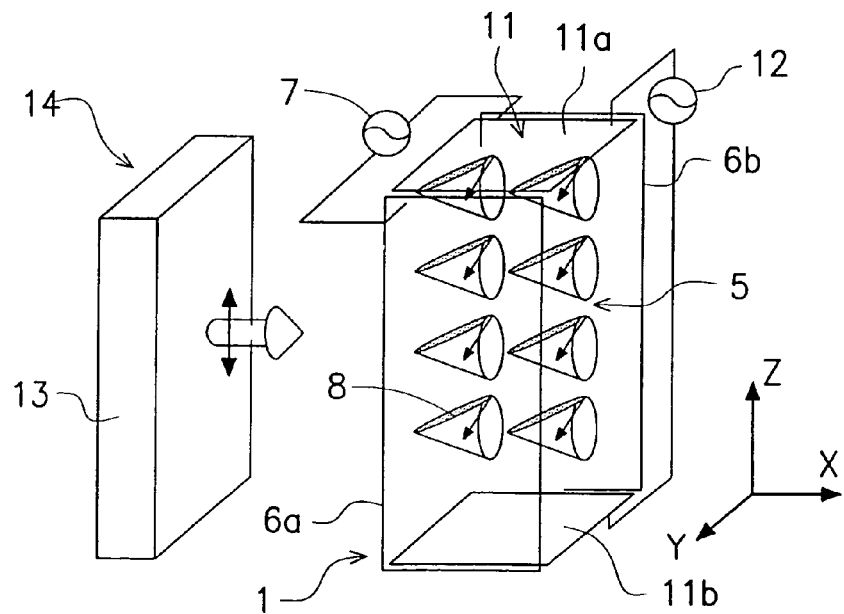
FIG. 6 schematically shows a perspective view of a light deflection device by combining light deflection elements according to the third embodiment of the invention.

Table 1 shows the light deflection position with respect to the combination of the liquid crystal directors and the polarization direction of the incident light according to the structures shown in FIGS. 5 and 6. The first embodiment is used for showing the properties. According to the structure in FIG. 5, the light deflection device is composed of two light deflection elements 1A and 1B. The incident light is deflected to the deflection positions of 1, 3 in Table 1 by the light deflection element 1A installed at the incident side, and then the deflection positions of 1, 3 are respectively deflected to positions 2, 4 by the light deflection element 1B installed at the light outgoing side.

TABLE 1

| | polarization plane of incident light | direction of electric field | direction of LC director | polarization position |
|---|---|---|---|---|
| 1 | X-Z plane | +Y | (cos22.5, 0, sin22.5) | (0, 0, 2.5) |
| 2 | X-Y plane | −Z | (cos22.5, sin22.5, 0) | (0, 2.5, 0) |

TABLE 1-continued

| | polarization plane of incident light | direction of electric field | direction of LC director | polarization position |
|---|---|---|---|---|
| 3 | X-Z plane | −Y | (cos22.5, 0, −sin22.5) | (0, 0, −2.5) |
| 4 | X-Y plane | +Z | (cos22.5, −sin22.5, 0) | (0, −2.5, 0) |

Fourth Embodiment

Figure 7:
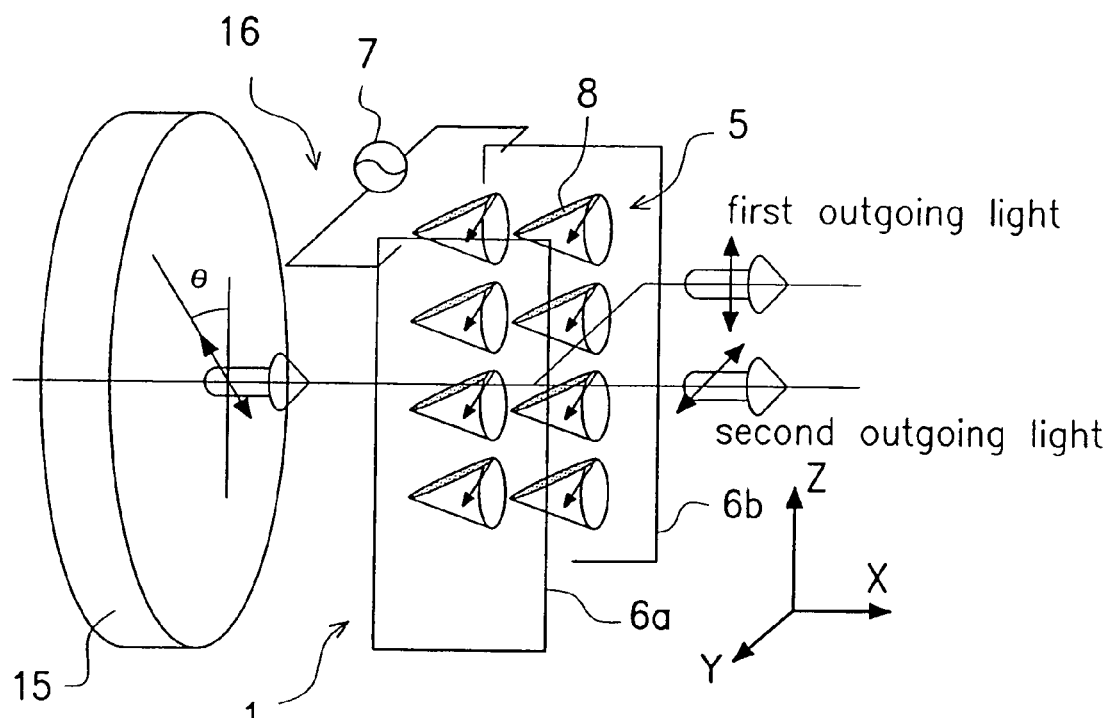
FIG. 7 schematically shows a perspective view of a light deflection device by combining light deflection elements according to the fourth embodiment of the invention.

The fourth embodiment of the invention is described with reference to FIG. 7. According to the structure of the light deflection device 16 of the fourth embodiment, a polarization direction switching device 15 for controlling the deflection direction of the incident light with a predetermined polarization angle with respect to the deflection direction of the light deflection element 1 is arranged at an incident side of the light deflection element shown in the first embodiment. Thereby, the light deflection can be freely controlled.

The polarization direction switching device 15 can be a faraday rotation element, or a rotation mechanism capable of mechanically rotating the polarization plate. The angle of the polarization direction being incident to the light deflection element can be set optionally. Assuming that the angle of the polarization direction (the inclined angle) of the incident light is $\theta$, with respect to the incident light P0, the component (light strength) P1 of the first outgoing light deflected by the electric field applied in the Y axis direction of FIG. 7 is consistent with the vector component of the Z-axis direction of the incident light, i.e., $P1=P0 \cos \theta$. The component (light strength) P2 of the second outgoing light that is not deflected is consistent with the vector component of the Y-axis direction of the incident light, i.e., $P2=P0 \sin \theta$. However, the light decay and scattering are ignored. Namely, the light components can be set with any ratio by properly setting the angle $\theta$. Additionally, the deflection direction of the incident light can be obtained by measuring the components P1, P2 of the outgoing lights, by which the angle $\theta$ of the polarization direction due to the polarization direction switching device 15 can be adjusted.

The fourth embodiment is described by combining the light deflection element 1 having the structures shown in FIGS. 1 and 2. However, a light deflection element having an electrode pair structure that is described below can be also combined together.

Fifth Embodiment

Figure 8:
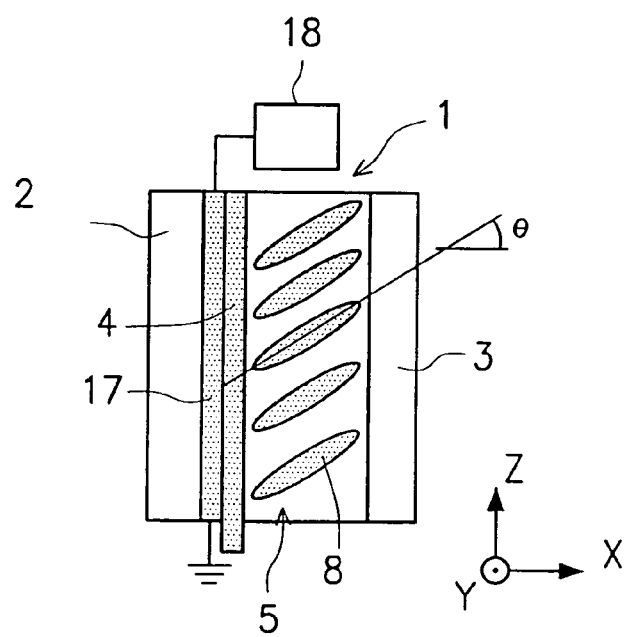
FIG. 8 schematically shows a cross-sectional view of a light deflection element for describing its operation according to the fifth embodiment of the invention.

The fifth embodiment of the invention is described with reference to FIG. 8. As describe above, the fifth embodiment focuses on the variation that the inclined angle $\theta$ varies with the temperature T in regard to the chiral smectic C phase liquid crystal. For example as shown in FIG. 8, an electrical resistant material 17 used as a heating source is set within the light deflection element 1 of the first embodiment shown in FIG. 3. The electrical resistant material 17 is coupled to a temperature control device 18 for controlling a driving current. The light deflection position controlling device for controlling the deflection position due to the light deflection element 1 is constructed by the combination of the direction control of the electric field using the electrode pair and the temperature control of the light deflection element 1 (in particular, the liquid crystal 5) using the electrical resistant material 17.

The electrical resistant material 17 is transparent for the wavelength in the visible range and has a suitable electrical resistance. In addition, the electrical resistant material 17 can, be preferably a material superior in thermal durability (about room temperature to 70° C.). For example, an ITO material can be used and is formed between the substrate 2 and the alignment layer 4.

Using the temperature control device 18, the temperature of the light deflection element 1 can be monitored by a temperature sensor (not shown) such as a thermo resist and then the difference between a preset temperature and the monitored temperature is reduced. Therefore, the driving current can flow through the ITO (the electrical resistant material 17) to generate a Joule heat such that temperature control is achieved. The preset temperature is set above the environment temperature around the light deflection element 1 and within a range capable of obtaining a suitable inclined angle θ.

According to the fifth embodiment, the inclined angle θ can be controlled by the temperature and therefore the light deflection can be controlled. In addition, position control can be performed similar to the fine tuning by the electric field. Therefore, a suitable light deflection can be achieved by using the temperature, the electric field, or the combination of the temperature and the electric field.

In the fifth embodiment, the description and explanation use the light deflection element 1 that is composed of the chiral smectic C phase liquid crystal 5 with the homeotropic alignment. However, a light deflection element that is composed of the chiral smectic C phase liquid crystal 5 with a homogeneous alignment (described below) can be also suitable for the embodiment.

Sixth Embodiment

The sixth embodiment of the invention is described with reference to FIGS. 9A and 9B. According to the sixth embodiment, the light deflection element 21 is also composed of the chiral smectic C phase liquid crystal 5 with a homeotropic alignment, but the arrangement and structure of an electrode pair, serving as the electric field applying device, is different from the electrode pair in the previous embodiments. Namely, using the first embodiment for example, the electrode pair 6 is arranged in the position that does not overlap the optical path and the electric field is applied to the liquid crystal 5 externally. However, in the sixth embodiment, an electrode pair 22 consisting of electrodes 22a, 22b for creating an electric field is arranged in the liquid crystal interposed between the faced substrates 2, 3.

For example, any one of the electrodes 22a, 22b is formed in a comb-teeth shape and aligns with the Z axis, wherein the Z axis is perpendicular to the deflection direction. The electrodes 22a, 22b are interleaved, and a voltage is applied between the electrodes 22a, 22b by a power source. Accordingly, the direction of the electric field can be in the +Z axis or the −Z axis direction due to the position arrangement of the electrodes 22a, 22b. As shown in FIG. 9A, the outgoing light out of the light deflection element 21 can be in two directions within the same light deflection element 21. For example, if only one of the outgoing lights is taken, the other outgoing light can be masked. A structure different from the embodiment can be also used if a vertical electric field (for example, the Z axis direction in FIGS. 9A and 9B) can be generated. Furthermore, the electrode end, which connects the electrodes 22a or 22b, can be formed inside or outside the light deflection element through a high impedance member.

Namely, in the light deflection element 1 with the structure of the first embodiment, the direction of the liquid crystal director 8 is controlled by applying an external electric field in the Z axis direction. However, the light deflection element 21 of the sixth embodiment can be controlled by an electric field within the light deflection element 21. As a result, the required voltage applied to the electrodes can be significantly decreased because the distance between the electrodes 22a, 22b is shortened. For example, according to the sixth embodiment, if the electrode distance of the internal electrodes 6a, 6b is 0.2 mm, only 1/1000 voltage is required for generating the electric field having the same magnitude so that the electrode distance of the external electrodes 6a, 6b is 20 mm as in the foregoing embodiments. Therefore, because the high voltage power source 7 for generating the external electric field is not required, the sixth embodiment is advantageous to form a small and compact light deflection element.

Seventh Embodiment

The seventh embodiment of the invention is described with reference to FIG. 10. Basically, the light deflection device 23 is constructed based upon the light deflection element 21 in the previous embodiment. The light deflection device 23 contains the chiral smectic liquid crystal 5 with the homeotropic alignment and has electrode pairs that are arranged inside the light deflection element and serve as an electric field applying device for creating an electric field. In the embodiment, two sets of the electrode pairs 24, 25 are formed. The electrode pairs 24 are respectively formed by electrodes 24a, 24b. The electrodes 24a, 24b are interleaved such that a horizontal electric field (for example, the Y axis direction in the drawing) can be created at an interface between the substrate 2 and the liquid crystal 5. The electrode pairs 25 are respectively formed by electrodes 25a, 25b. The electrodes 25a, 25b are interleaved such that a vertical electric field (for example, the Z axis direction in the drawing) can be created at the interface between the substrate 2 and the liquid crystal 5. Namely, the directions of the electric fields that are respectively created by the electrodes 24a, 24b and 25a, 25b are perpendicular. The voltage to create the electric field is applied to any of the electrode pairs 24, 25 by a respective power source.

According to the above structure, the operation is substantially similar to that of the light deflection element 21. However, because there are two sets of electrode pairs 24, 25, the incident light can be deflected to multiple directions, for example the four basic directions of up, down, left and right with respect to the drawing, by properly controlling the timing when the electric fields are applied to the electrode pairs 24, 25.

Eighth Embodiment

The eighth embodiment of the invention is described with reference to FIG. 11. Basically, the light deflection device 31 of the embodiment is constructed based upon the light deflection element 1 in the first embodiment. The liquid crystal used in the light deflection device 31 is also the chiral smectic C phase liquid crystal. However, the difference between the eighth and sixth embodiments is that a homogeneous aligned chiral smectic C phase liquid crystal 32 is used in the eighth embodiment.

Similar to the homeotropic alignment in the previous embodiments, the external electric field is applied in the Y axis direction, i.e., from the outside to the inside of the drawing. In the chiral smectic C phase liquid crystal 32 with the homogeneous alignment, the direction of the liquid crystal director 8 can be controlled in the first or the second aligned state according to the direction of the applied electric field. A rubbing process is performed on the alignment layer 4 for the liquid crystal alignment, and the direction of the liquid crystal directors 8 is strongly restricted to a direction that is highly dependent on the rubbing direction. Therefore, the direction of the electric field and the direction of the transparent substrates 2, 3 have strong contribution to the property of the light deflection. Therefore, the position accuracy of the arrangement of the substrates 2, 3 has to be increased. However, if a gradient of the electric field occurs, regarding the homeotropic alignment where the light deflection is easily changed on the surface due to the gradient of the electric field, an effect for reducing the difference due to the position can be obtained.

According to the structure of the light deflection element 31, an incident light that is linearly polarized in the Z axis direction is used, and the outgoing light can be in the a direction (the first aligned state) or the b direction (the second aligned state) according to the alignment state of the liquid crystal 32, thereby the optical path is shifted.

The ninth embodiment of the invention is described with reference to FIGS. 12A and 12B. Basically, the light deflection device 33 of the embodiment is constructed based upon the light deflection element 31 composed of the chiral smectic C phase liquid crystal 32 with the homogeneous alignment in the previous embodiment. An electrode pair 34 composed of transparent plate electrodes 34a, 34b is formed as an electric field applying device. The electric field applying device is formed to sandwich the liquid crystal 32 such that the liquid crystal 32 can be filled therein. By the electrode pair 34, the electric field is applied in a direction perpendicular to the liquid crystal director 8 with a homogeneous alignment, i.e., in the direction of the spontaneous polarization of the liquid crystal director 8. The surface of the liquid crystal 32 is tilted by an angle $\Phi$ with respect to the incident light, and therefore the opposite surfaces of the substrates 2, 3 are tilted relative to the surface of the liquid crystal 32.

FIG. 12B shows a cross-sectional view along the line A-A' in FIG. 12A. As shown, the liquid crystal director 8 is aligned in two directions (the first and the second aligned states) according to the direction of the electric field applied to the electrodes 34a, 34b.

According to the structure of the light deflection element 33, the incident light can be deflected more efficiently so that the alignments of director 8 are substantially perpendicular as shown in FIG. 12B.

In order to restrict the alignment states of the liquid crystal 32 in the perpendicular direction, a rubbing process is performed on the alignment layers formed on the transparent substrates 2, 3 according to the alignment of the liquid crystal, and therefore, the direction of the liquid crystal directors 8 is strongly restricted to a direction that is highly dependent on the rubbing direction.

According to the features of the light deflection element 33, the transparent electrodes 34a, 34b are formed easily because plate electrodes can be used. There are no moiré patterns etc formed to interfere the light propagation because the patterning process is not required. In comparison with that the electric field that is generated by the external electrodes, no high voltage is required and therefore, the light deflection element 33 can become smaller and compact.

In the ninth embodiment, the chiral smectic C phase liquid crystal 32 with the homogeneous alignment is used, but the chiral smectic C phase liquid crystal 32 with the homeotropic alignment is also suitable.

Tenth Embodiment

Figure 13:
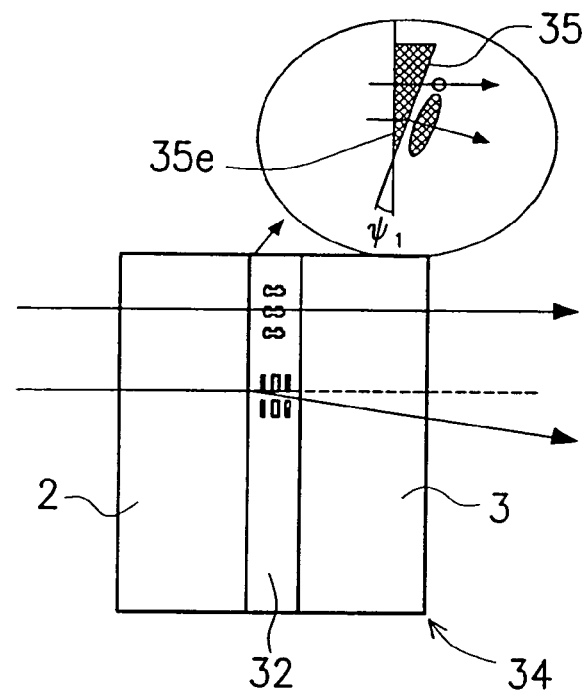
FIG. 13 schematically shows a cross-sectional view of a light deflection element for describing its operation according to the tenth embodiment of the invention.

The tenth embodiment of the invention is described with reference to FIG. 13 to FIG. 15. Basically, the light deflection device 34 of the embodiment is constructed based upon the light deflection elements 31, 33 composed of the chiral smectic C phase liquid crystal 32 with the homogeneous alignment, but two interfaces adjacent to the liquid crystal 32 are tilted by a predetermined angle $\psi_1$ ($\psi_1 \neq 0$). Similar to FIG. 12, the alignment states of the liquid crystal 32 can be controlled by the transparent electrodes (not shown) formed in the vicinity of the two interfaces of the liquid crystal 32. In order to keep a state having the tilt angle $\psi_1$ and the cap converging within a demanded range, wedge portions 35 or spaced jagged portions are formed as shown in FIG. 13. The wedge portions 35 or spaced jagged portions can be formed by etching a glass substrate or processing a transparent plastic material by injection molding. No matter what method is used, because the alignment of the liquid crystal is easily disturbed at the edge 35e of the wedge portions 35 or spaced jagged portions, it is better that the incident light does not pass through those portions.

According to the above structure, the feature of the light deflection element 34 is that the outgoing light relative to the incident light can be rotated and moved by controlling the liquid crystal director 8. Therefore, an expected deflection amount can be obtained by properly choosing a distance between a receiving position and the light deflection element 34.

Figure 14:
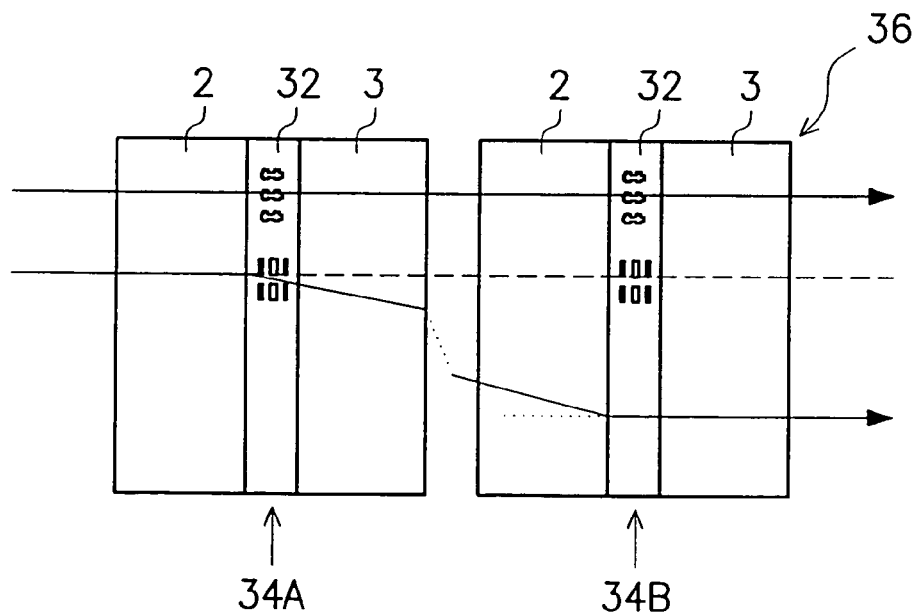
FIG. 14 schematically shows a cross-sectional view of a light deflection device using the light deflection elements in FIG. 13 according to the tenth embodiment of the invention.

In addition, as shown in FIG. 14, a light deflection device 36 is constructed by arranging two light deflection elements 34A, 34B in the direction of the light propagation. A necessary deflection amount so that the outgoing light and the incident light can be kept in parallel is adjusted by properly choosing the distance between the two liquid crystals 32. Therefore, the deflection amount can be easily adjusted externally and a convenient and superior light deflection device 36 can be formed. As shown in FIG. 15, if the light deflection amount is fixed, an intermediate substrate 37 having a thickness L can be interposed between the two liquid crystals 32a, 32b in a light deflection device 38.

Figure 15:
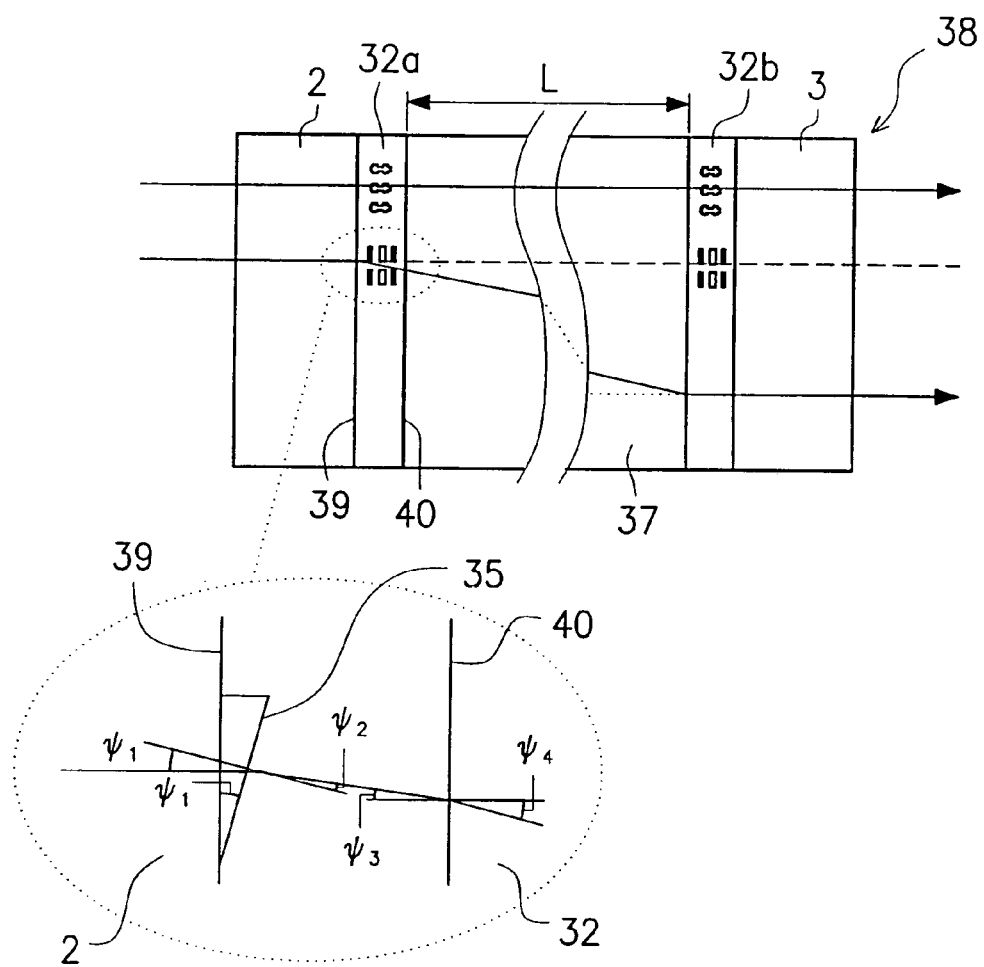
FIG. 15 schematically shows a cross-sectional view of one variation of the light deflection device in FIG. 14.

As shown in FIG. 15, in order to calculate the light propagation direction of the light deflection element 38 rigorously as described above, the index of refraction of each direction is calculated based on the ellipsoid of the index of refraction from the indexes of refraction ne, no and the direction of the directors 8 with respect to the direction of the incident light, and therefore, the light propagation direction can be calculated based upon the above results. However, for simplicity, assuming that the indexes of refraction ne and no are changed by the alignment states of the liquid crystal 32, the propagation direction of the light (i.e., the rotational angle) is calculated according to the Snell's law.

Assume that the index of refraction of liquid crystal 32 in the long axis direction (ne) is 1.8 and the index of refraction in the short axis (no) is 1.6. With respect to the direction of the light propagation, the substrate 2 is arranged such that an angle (p formed between the normal line at the interface 39 of the liquid crystal 32a and the incident light is 3°, and an angle formed between the normal line at the interface 40 of the liquid crystal 32a and the incident light is 0°. In addition, an optical material in contact with the liquid crystals 32a, 32b is selected to have an index of refraction of no. According to the Snell's law, the rotational angle $\phi_2$ from the normal line of the interface 39 of the liquid crystal 32a is calculated as follows.

$$\sin \phi_2 = (no/ne) \sin \phi_1, \text{ then } \phi_2 = 2.67°$$

In addition, a rotational angle $\phi_3$ from the normal line of the substrate opposite to the light that is incident to the substrates 2, 3 sandwiching the liquid crystal 32 can be calculated as follows.

$$\phi_3 = \phi_1 - \phi_2 = 0.33°$$

A rotational angle $\phi_4$ at the interface 40 of the substrate 37 of the light incident to the substrates 2, 3 can be calculated as follows.

$$\sin \phi_4 = (no/ne) \sin \phi_3, \text{ then } \phi_4 = 0.37°$$

If the thickness of the intermediate substrate 37 is L, the required thickness L for obtaining a shift amount of 5 μm can be calculated as follows:

$$L \cdot \sin \phi_4 = 5.0 \text{ (μm)}, \text{ then } L = 0.772 \text{ (mm)}$$

Eleventh Embodiment

FIGS. 16A, 16B and 16C show one embodiment of the invention, in which FIG. 16A is a tope view, FIG. 16B is a front view and FIG. 16C is a cross-sectional view. An electrode lines 9 are arranged on the surface of at least one of the substrates. In this configuration, spacers 10 on both sides of the light deflection element do not require to serve as electrodes. In addition, an alignment layer 4 can be also arranged on the substrate surface having the electrode lines 9 thereon. In FIG. 4, eight electrode lines 9 are formed, and a voltage applying device 11 is arranged so that voltages respectively applied to the electrode lines from the most left side are stepwise increased or decreased. For example, a voltage supplied from a power source 7 is divided by seven resistors 12, and each electrode line 9 is connected between two adjacent resistors 12, by which step voltages can be applied to the electrode lines 9 respectively. The method for applying step voltages is not limited to above configuration. For example, plural power sources can be directly connected to the electrode lines 9 respectively. Furthermore, the number, the width, and the line pitch of the electrode lines, and the voltage difference between two electrode lines can be properly set according to the desired size of the optical path or light shift amount etc. According to the above structure, because a potential gradient is forcedly formed in the liquid crystal layer with a wider width, and therefore, macroscopically, an electric field with a uniform strength can be obtained in the whole light deflection element.

However, the width portion of each electrode line 9 is equi-potential and microscopically, desired potential gradient in vicinity of the electrode line cannot be obtained, and therefore, desired defection effect of the light path cannot be obtained. Therefore, in this embodiment, the regions not in vicinity of the electrode lines 9 are used as effective regions of the light deflection element. It is preferred to set a shading material to block the light passes near the electrode lines 9, so that the incident light can corresponds to the effective regions in advance. For example, when the light deflection element is applied to the image display apparatus, it is preferred to make the pixel pitch and the electrode line pitch consistent, so that spaces among the pixels correspond to the electrode lines. In FIG. 4, seven light paths that the light is incident are arranged between electrode lines 9. The direction of the electric field is switched by the voltage applying device 11, the seven light paths are simultaneously shifted to the same direction.

As shown in FIGS. 16A~16C, a plurality of electrode lines is formed on light path regions where light is desired to pass through the light deflection element. The voltages applied to each electrode lines are stepwise varied from one end. Even though the effective cross-sectional area of the light path is large, a smooth potential gradient in the plane direction of the liquid crystal layer over the entire region of the electrode lines can be obtained, macroscopically. Therefore, effective portions, which form desired strengths of the electric field in the liquid crystal layer over the entire light path region can be at least discretely formed. By only using the effective portions, the light path with a large cross-sectional area can be more uniformly deflected.

Following is an experiment of the above embodiment. The electrode lines are formed by vaporizing aluminum on the surface of the glass substrate with a size of 3 cm×4 cm and a thickness of 3 mm. 20 aluminum electrode lines are formed with a width of 2 mm, wherein the line width is 10 μm, the line pitch is 100 μm and the line length is 2 cm. One of these electrode lines at the end is made to have a large width and pitch in order to obtain a contact point from the power source. The substrate having no aluminum electrode lines thereon is processed by the silane coupling agent (AY43-021, made by Toray Dow Corning Silicon) to form a vertical alignment layer. The mylar sheets with a thickness of 50 μm, a width of 1 mm, and a length of 3 cm are used as the spacers, are arranged on the inner surfaces of the vertical alignment layer, and then two glass substrates having and having no electrode lines are oppositely arranged. The two mylar sheets are parallel and have a separation of 2 mm. The substrate is heated up to 90° C., and then ferroelectric liquid crystal (CS1029, made by Chisso Corporation, Japan) is filled between the two substrates by a capillary method. After being cooled, similar to FIG. 16A~16C, using an adhesive to seal to form a light deflection element.

The light through the mask pattern passes near the center between the aluminum electrode lines of the light deflection element, and and then observed by the microscope. When no electric field exists, the mask pattern is directly observed without being changed. One end of each of the 20 aluminum electrode lines is connected to a wire, and then connected between the resistors of the serial-connected resistors. Each resistor is 1MΩ, and 19 resistors are connected in series. Using the pulse generator and the high-speed power amplifier, a rectangular voltage of ±200V is applied across the two ends of the series-connected resistors. As a result, a peak-to-peak light path shift amount of 4.5 μm can be confirmed. The same shift amount of all the light paths between two electrode lines and the response time of 0.35 msec can be confirmed.

Figure 17:
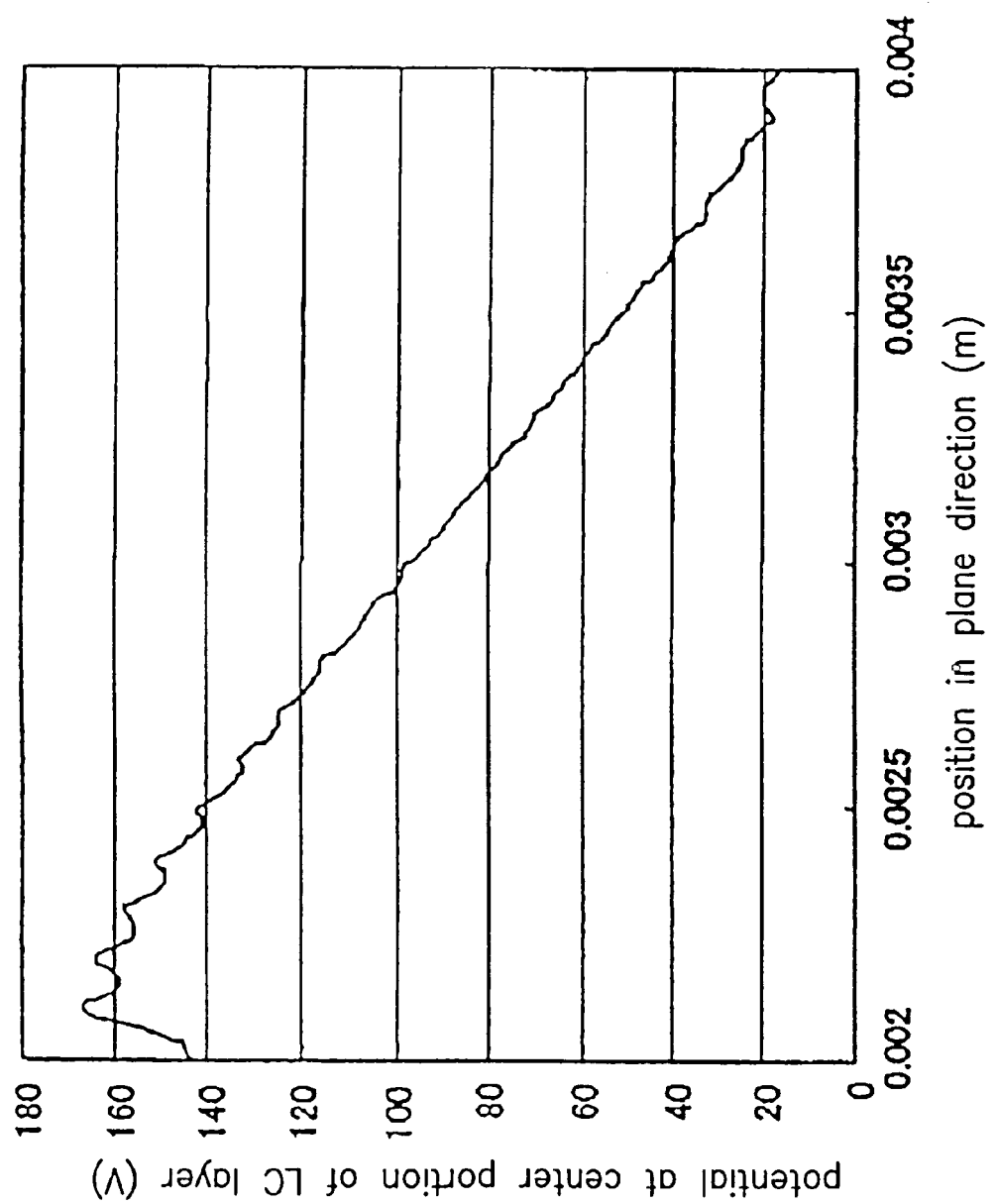
FIG. 17 shows a potential distribution on the electrode lines on one substrate.
Figure 18:
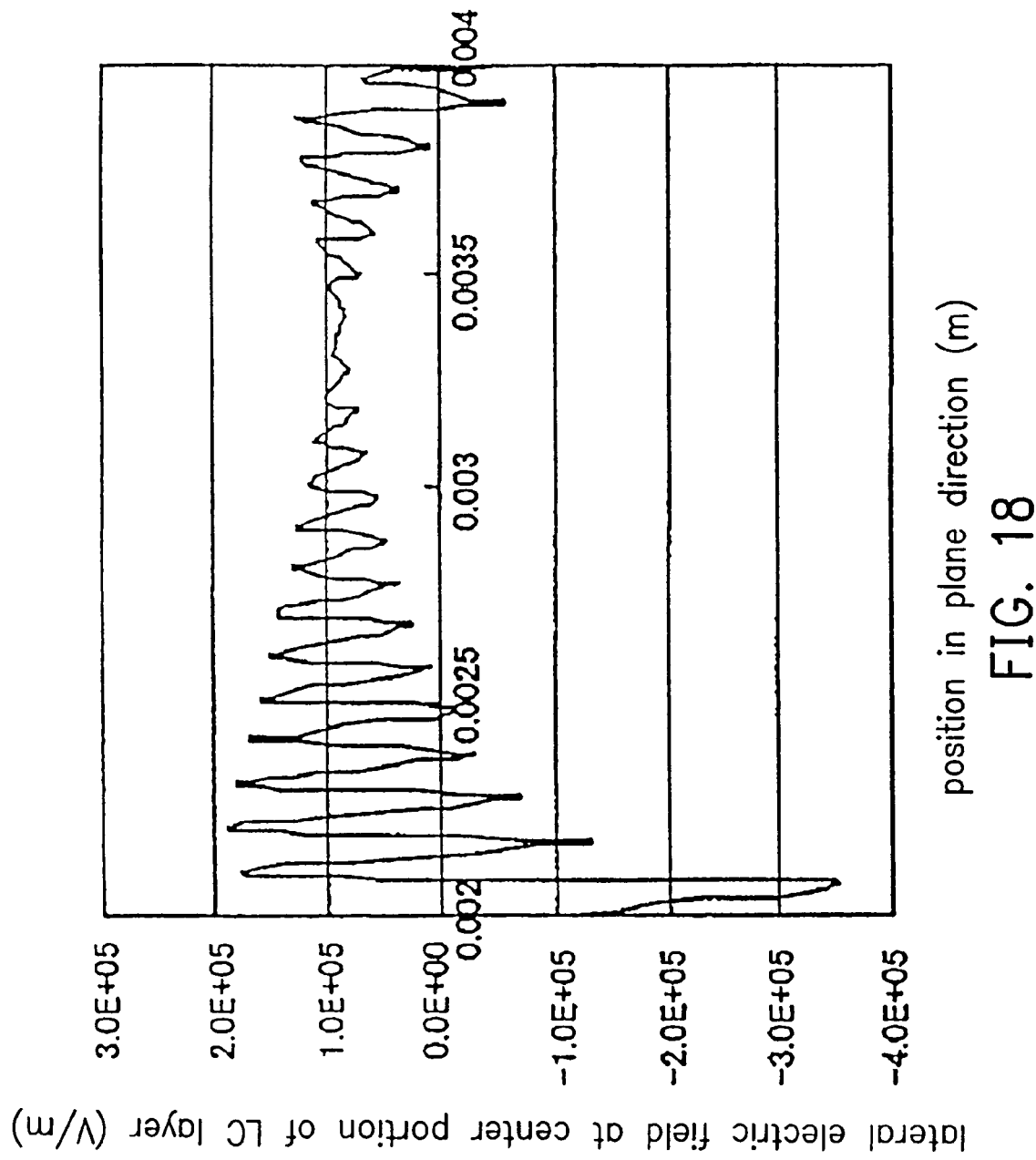
FIG. 18 shows a distribution of electric field on the electrode lines on one substrate.

From a simulation result of a two-dimensional electric field, the potential distribution and the electric field distribution at the center portion of the liquid crystal layer can be obtained as shown in FIGS. 17 and 18. In FIG. 18, as observing the strength of the electric field, because only the portion with a strong electric field is used, although it has a descrete distribution within a width region of 2 mm, but a uniform light path deflection region can be obtained.

Twelfth Embodiment

As shown in FIGS. 16A~16C, to simply the structure, the electrode lines are formed on only one substrate. However, in this configuration, an electric field might occur in the thickness direction of the liquid crystal layer 5. If the electric field in the thickness direction of the liquid crystal layer 5 becomes large, the direction of the liquid crystal directors in the thickness direction of the liquid crystal layer 5 becomes not uniform. A desired light path deflecting amount cannot be obtained for a thick liquid crystal layer. Therefore, a configuration shown in FIG. 19 is proposed.

Figure 19:
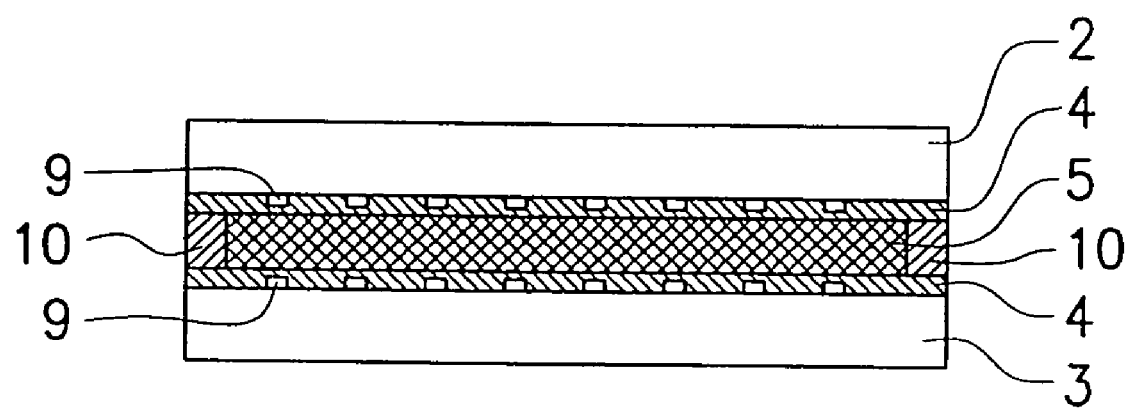
FIG. 19 is a diagram for describing one embodiment of the invention.

FIG. 19 shows another embodiment of the invention. Referring to FIG. 19, two sets of electrode lines 9, 9 are formed so as to be respectively opposite to regions containing the light paths on the substrates 2, 3. The alignment layers 4 are formed on the two substrates 2, 3, but only one alignment layer 4 can be formed on one of the substrates 2, 3. By a voltage applying device (not shown), stepwise voltages are applied to the electrode lines from its end line. At this time, the pair of electrode lines facing to each other is applied with the same potential. Because the upper and lower interfaces of the liquid crystal layer 5 are applied with the same potential, the potential distribution, i.e., the strength of the electric field, in thickness direction of the liquid crystal layer 5 becomes small, so that the desired inclination of the liquid crystal molecules over the whole region of the liquid crystal layer 5 can be obtained to perform the deflection of the light path with excellent efficiency. Namely, because there are electrode lines formed on the two substrates, even though the effective cross-sectional area of the light path is large, the potential distribution in the thickness direction of the liquid crystal layer can become more uniform. Because the strength of the electric field in the thickness direction of the liquid crystal layer becomes small, when applying the electric field, the direction of the liquid crystal directors can become more uniform in the thickness direction of the liquid crystal layer and the entire light path can be more uniformly and efficiently deflected.

Figure 20:
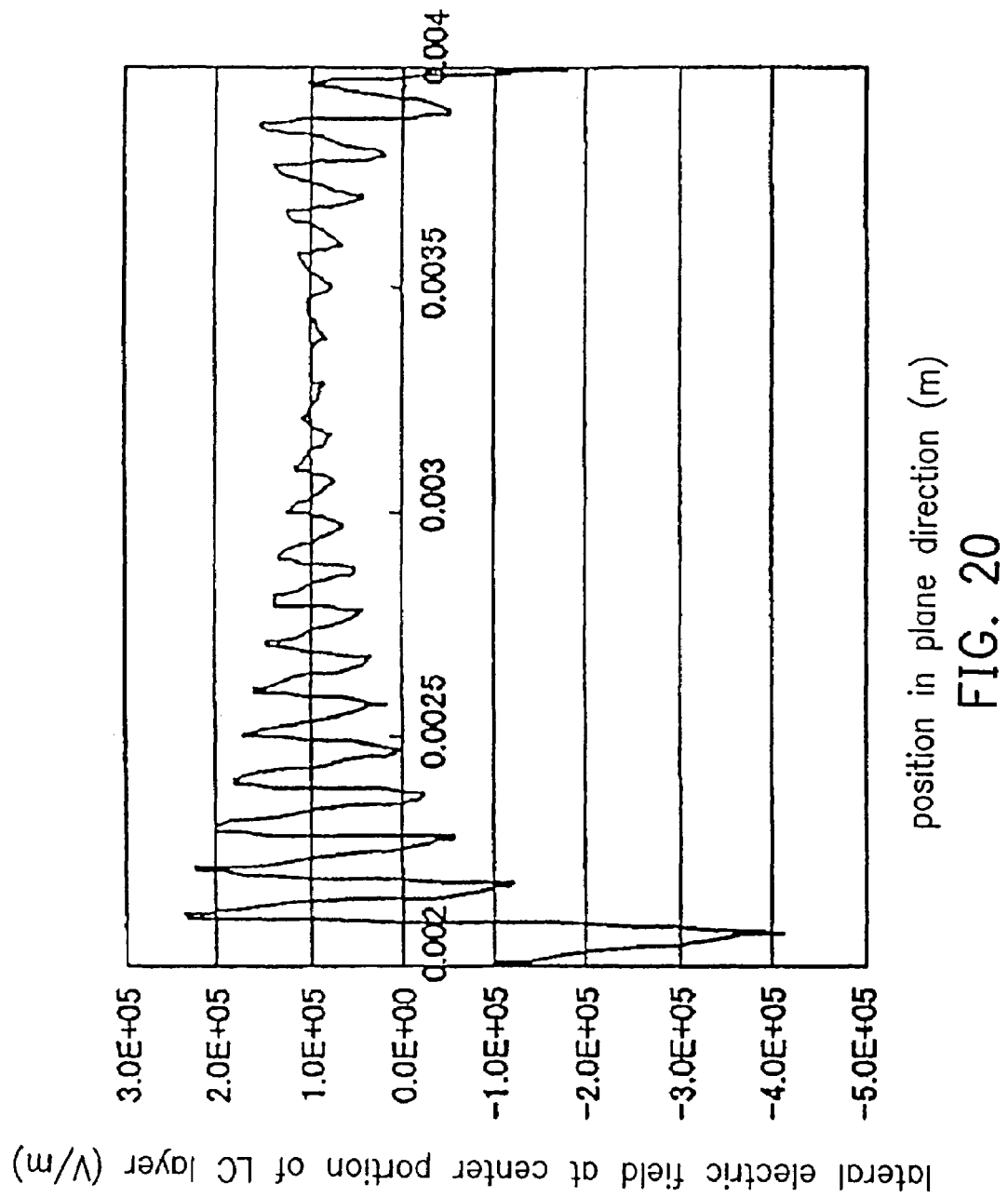
FIG. 20 shows a distribution of electric field on the electrode lines oppositely arranged on two substrates.

Following is an experiment of the above embodiment. As shown in FIGS. 19, 20 aluminum electrode lines are formed on the upper and lower substrates 2, 3. Except that the aluminum electrode lines on the two substrates are consistent with the light path, the other structure is as same as the previous embodiment. The wires from the aluminum electrode lines on the two substrates are respectively connected between the resistors of 19 series-connected resistors, so that the same potential is applied to the opposite aluminum electrode lines. Using the pulse generator and the high-speed power amplifier, a rectangular voltage of ±200V is applied across the two ends of the series-connected resistors. As a result, a light path shift amount of about 5 µm of all the light paths between two electrode lines and the response time of 0.3 msec can be confirmed.

From a simulation result of a two-dimensional electric field with the same condition in the eleventh embodiment, the electric field distribution at the center portion of the liquid crystal layer can be obtained as shown in FIG. 20. This electric field distribution is substantially the same as the electric field distribution in the lateral direction of FIG. 18. However, the uniformities of the potential and the electric field in the thickness direction are improved, and therefore, the light path shift amount becomes large and the response time also increases in comparison with the previous embodiment.

Thirteenth Embodiment

In the previous twelfth embodiment, the number of the electrode lines is fewer. For a light deflection element with a larger area, when an electric field with a more uniform strength is desired, the width of the electrode lines is made as smaller as possible and the line pitch is as narrower as better. However, the number of the electrode lines becomes many, the stepwise voltage applying device becomes more complicated, so that it is very difficult to draw wires from the substrates. Therefore, it is preferred that line number on each substrate is fewer. In practice, the line pitch is therefore set wider. However, as the line pitch becomes wider, the potential in vicinity of the center between two lines might be lower than the potentials of the two electrode lines. Namely, a reverse electric field may occur at a portion between the two electrode lines.

Figure 21A:
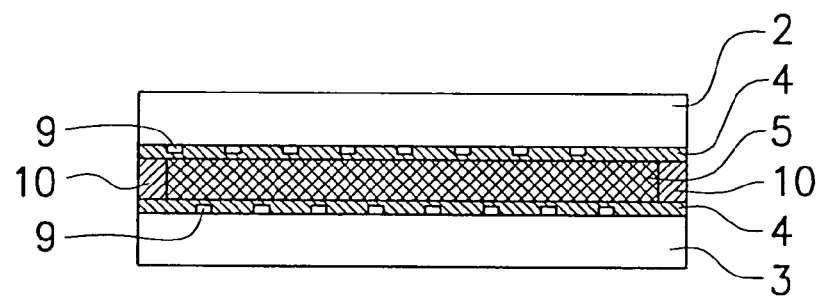
FIGS. 21A and 21B are diagrams for describing one embodiment of the invention.
Figure 21B:
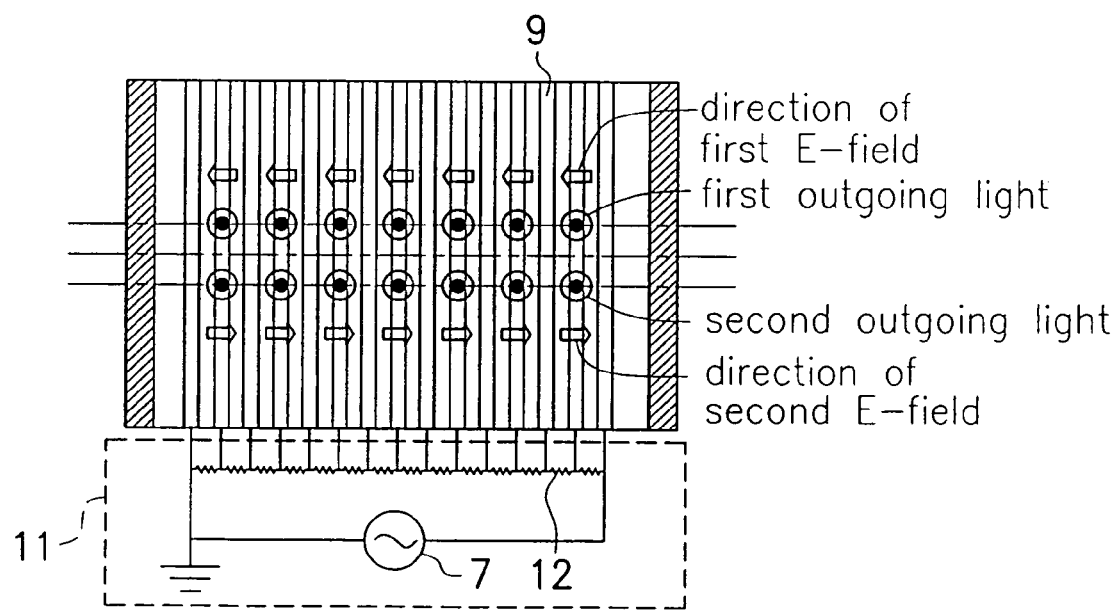

FIGS. 21A and 21B show the thirteenth embodiment of the invention, in which FIG. 21A is a top view and FIG. 21B is a front view. Referring to FIGS. 21A and 21B, two sets of electrode lines 9 are respectively formed on the two substrates 2, 3, and the two sets of electrode lines 9 on the two substrates 2, 3 are arranged in an interleaved manner. As shown in the front view of FIG. 21B, the applied voltage is stepwise increased or decreased from the most left electrode line to form a voltage applying device that the voltages applied between the two substrates are interleavedly and stepwise different. In FIG. 21B, similar to FIGS. 16A~16C, serial-connected resistors 12 are shown, but it is not to limit the scope of the invention. Because a desired potential in vicinity of the center between electrode lines on one substrate is forcedly applied by the electrode line on the other substrate, it can prevent the reverse electric field mentioned above from occurring. Additionally, even though in vicinity of the electrode line, because an electrode field occurs by the potential difference between the electrode lines near the opposite substrate, and therefore, it can obtain an effect of deflection of the light path on the electrode lines 9. In this embodiment, it is preferred that the electrode lines 9 are formed of transparent electrode material, such as ITO. Because the regions on the electrode lines 9 also serve as a function of light path deflection regions, the light path having larger cross-sectional area can be more uniformly deflected. Moreover, because only fewer number of the electrode lines 9 can be designed on one substrate 2 (or 3), the connection of wires etc can become easier.

In the foregoing description, when the separation of the electrode lines is wide, a portion having a lower potential occurs near the center between electrode lines and a reverse electric field may activate. However, the electrode lines one the upper and the lower substrates are arranged in the interleaved manner, so that the voltage applied is interleavedly changed. Therefore, even though the effective cross-sectional area of the light path is large, the potential variation in the surface direction within the liquid crystal layer can become more uniform and the occurrence of the reverse electric field can be also prevented. Accordingly, the light path with a large cross-sectional area can be more uniformly deflected.

Following is an experiment of the above embodiment. The electrode lines on the two substrates are changed to the ITO transparent electrode material. As shown in FIGS. 21A and 21B, except that the electrode lines on the two substrates are interleavedly arranged in the light path direction, the cells are made similar to the previous embodiment. The resistor having as half resistance of the resistor used in the previous embodiment is used, and therefore, 38 resistors (doubled number) are connected in series. The wires from the electrode lines on the two substrates are respectively and interleavedly connected between the adjacent resistors of the series-connected resistors. Using the pulse generator and the high-speed power amplifier, a rectangular voltage of ±200V is applied across the two ends of the series-connected resistors. Except the regions about 0.2 mm from the two ends of the light path deflection element having a width of 2 mm, even thought on the transparent electrode lines, a light path shift amount of about 55 µm and a response time of about 0.3 msec can be confirmed. In the above configuration, not only the regions between the electrode lines, but also the regions on the electrode lines have the effect of light path deflection.

Figure 22:
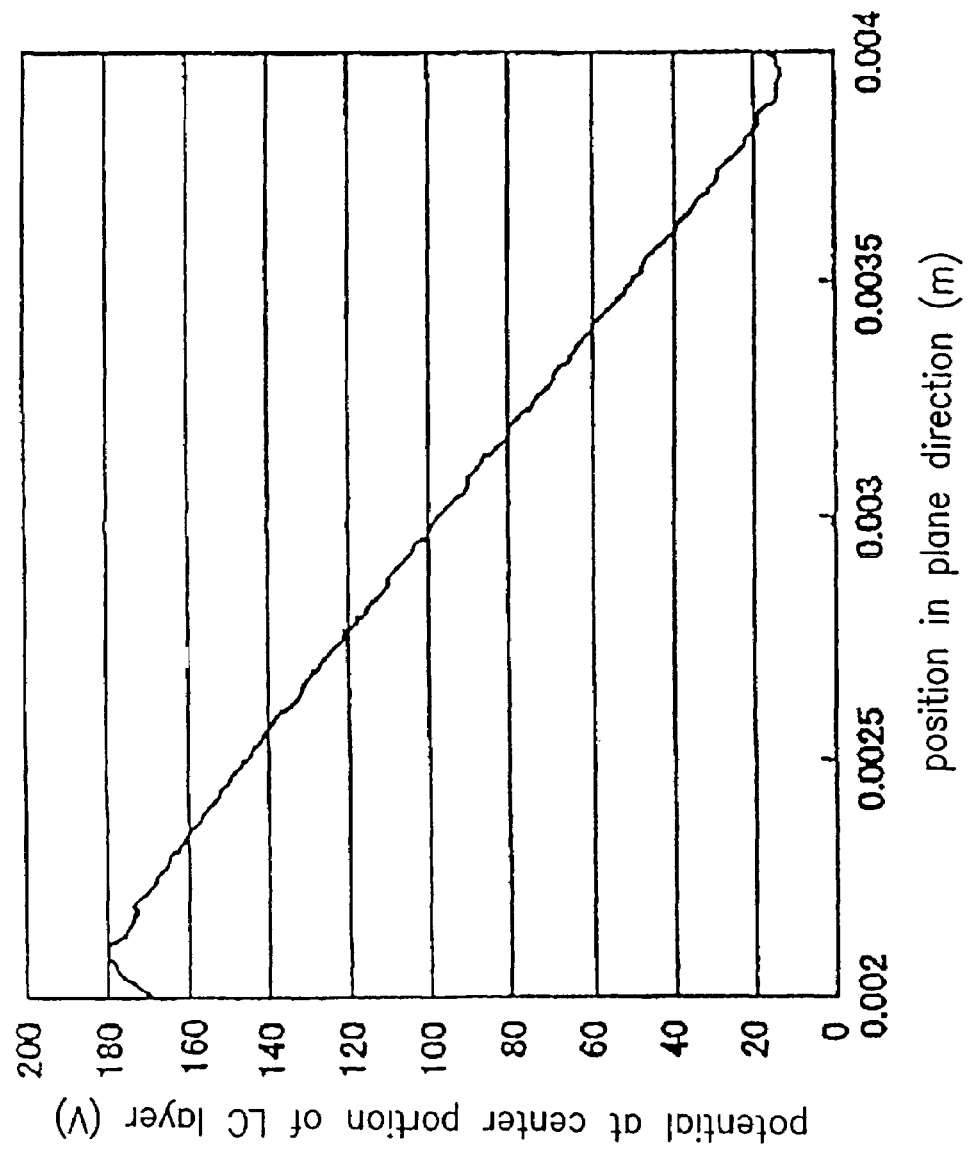
FIG. 22 shows a potential distribution on the electrode lines interleavedly arranged on two substrates.
Figure 23:
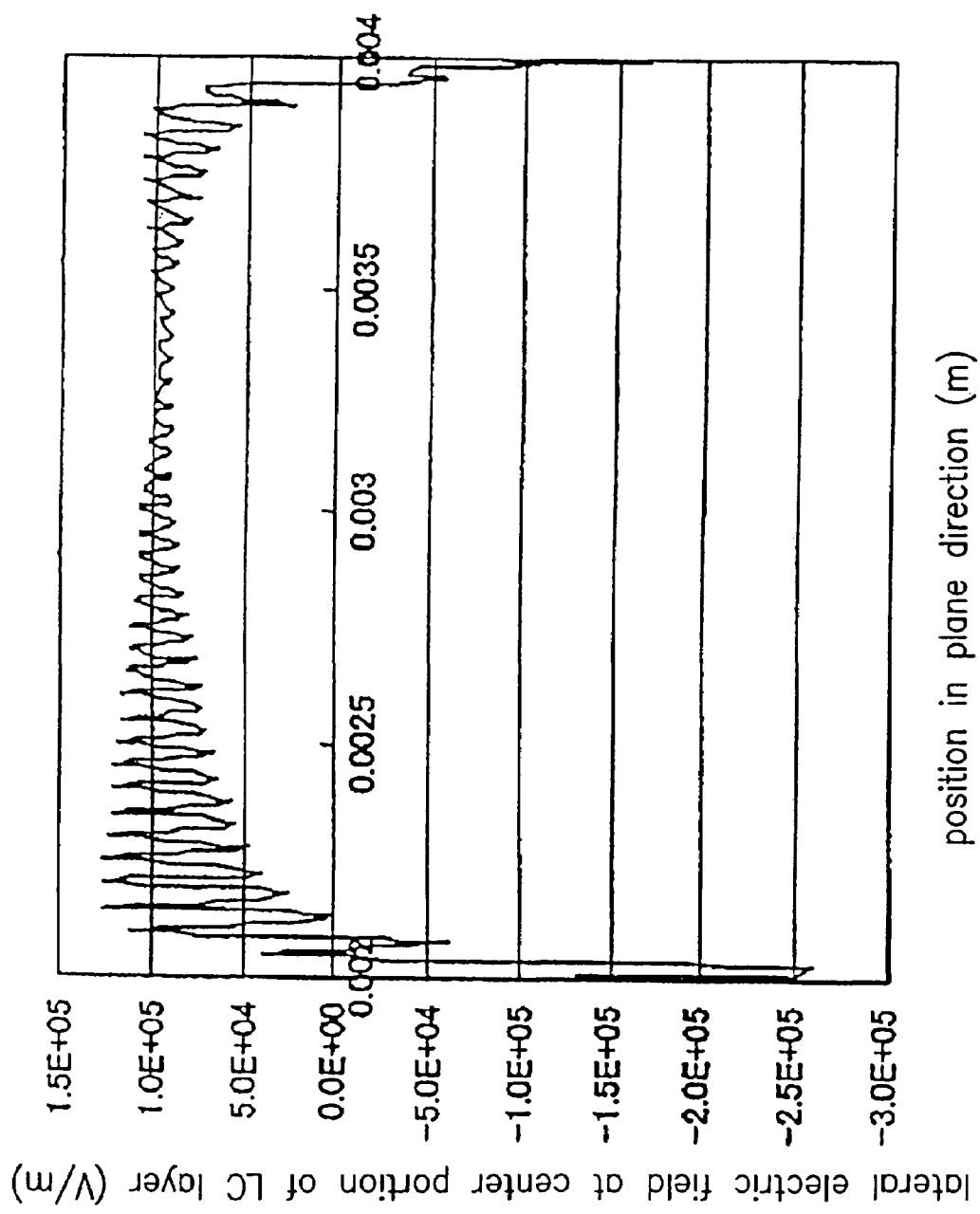
FIG. 23 shows a distribution of electric field on the electrode lines interleavedly arranged on two substrates.

From a simulation result of a two-dimensional electric field, the voltage distribution and the electric field distribution at the center portion of the liquid crystal layer can be obtained as shown in FIG. 22 and FIG. 23. In this configuration, it could be understood that a weaker electric field or a reverse electric field occurs near the spacers. However, except that, as observing the amplitude of the electric field, averagely, a more uniform electric field can be obtained.

Fourteenth Embodiment

Figure 24:
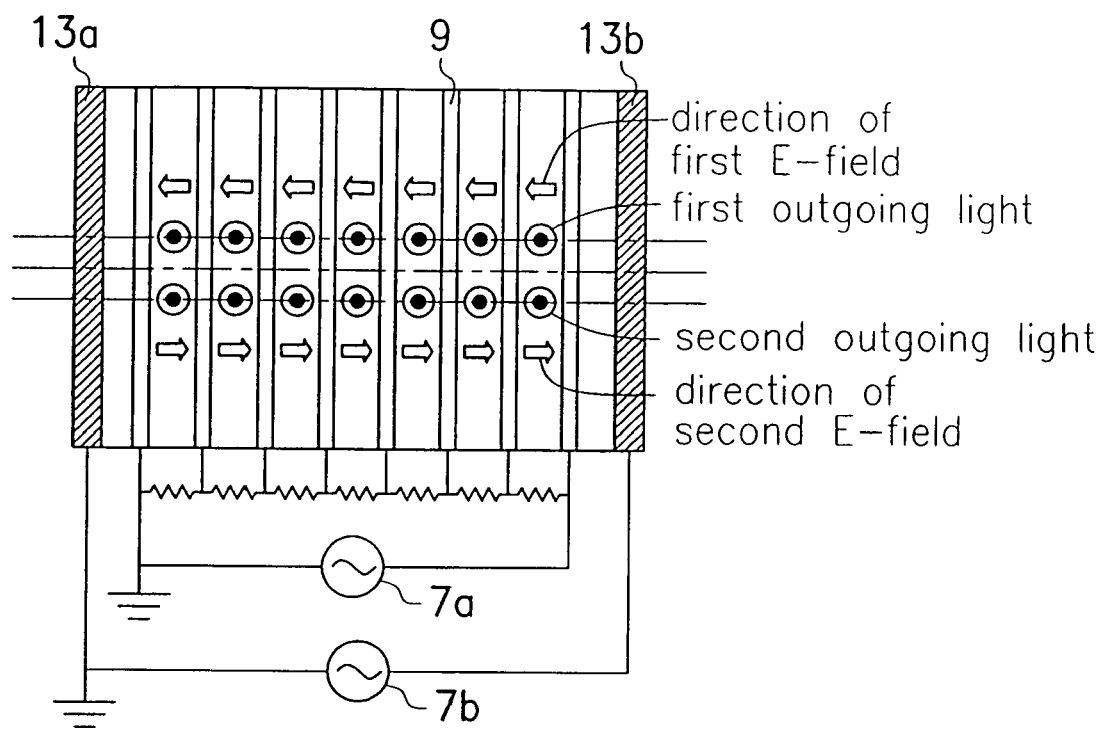
FIG. 24 is a diagram for describing one embodiment of the invention.

FIG. 24 shows the fourteenth embodiment of the invention. In FIG. 24, the spacers 10 in FIGS. 16A~16C is an electrode pair 13a, 13b made of conductive material. One of the electrode pair 13a, 13b also serving as the spacers is applied with a voltage value equal or larger than the maximum voltage value applied to the electrode line group 9, and the other electrode of the electrode pair 13a, 13b is applied with a voltage value equal or smaller than the minimum voltage value applied to the electrode line group 9. In FIG. 24, the power source 7b connected to the electrodes 13a, 13b also serving as the spacers at the two ends is can be independently formed, but can be also used in common with the power source 7a connected to the electrode line group 9. The voltage value applied to the electrodes 13a, 13b at the two ends is in consideration of the influence of leakage electric field to the peripherals of the light deflection element etc. The switch timing of the polarity is synchronized with the polarity switch of the applied voltage to the electrode lines 9. Even though the potential gradient in the plane direction within the liquid crystal layer due to the electrode line group is set not to be uniform, by applying the auxiliary voltage between the electrodes that also serve the spacer, at the two ends, the potential gradient in the plane direction within the liquid crystal layer becomes smooth, the light path with a large cross-sectional area can be more uniformly deflected. In addition, in order to make the regions on the electrode lines 9 serve as a function of light path deflection regions, transparent electrode lines are preferred.

As described above, the voltage is stepwise applied to the electrode lines within the region of the light path. Additionally, by the electrodes that serve as the spacers exterior to the region of the light path, even though the effective cross-sectional area of the light path is large, because the auxiliary voltage is applied between two electrodes and the potential gradient in the plane direction with the liquid crystal layer is smooth, the light path having a large cross-sectional area can be more uniformly deflected.

Following is an experiment of the above embodiment. Similar to one embodiment described above, the spacers of the mylar sheets are replaced by the aluminum electrode sheets. As shown in FIG. 24, except that voltage can be applied to the aluminum electrode sheets, the others are as the same as the previous embodiment. Using the pulse generator and the high-speed power amplifier, a rectangular voltage of ±200V is applied across the two ends of the series-connected resistors and to the aluminum electrode sheets. As a result, a light path shift amount of about 5 µm at all regions of the light path deflection element having a width of 2 mm, and a response time of 0.3 msec can be confirmed.

Figure 25:
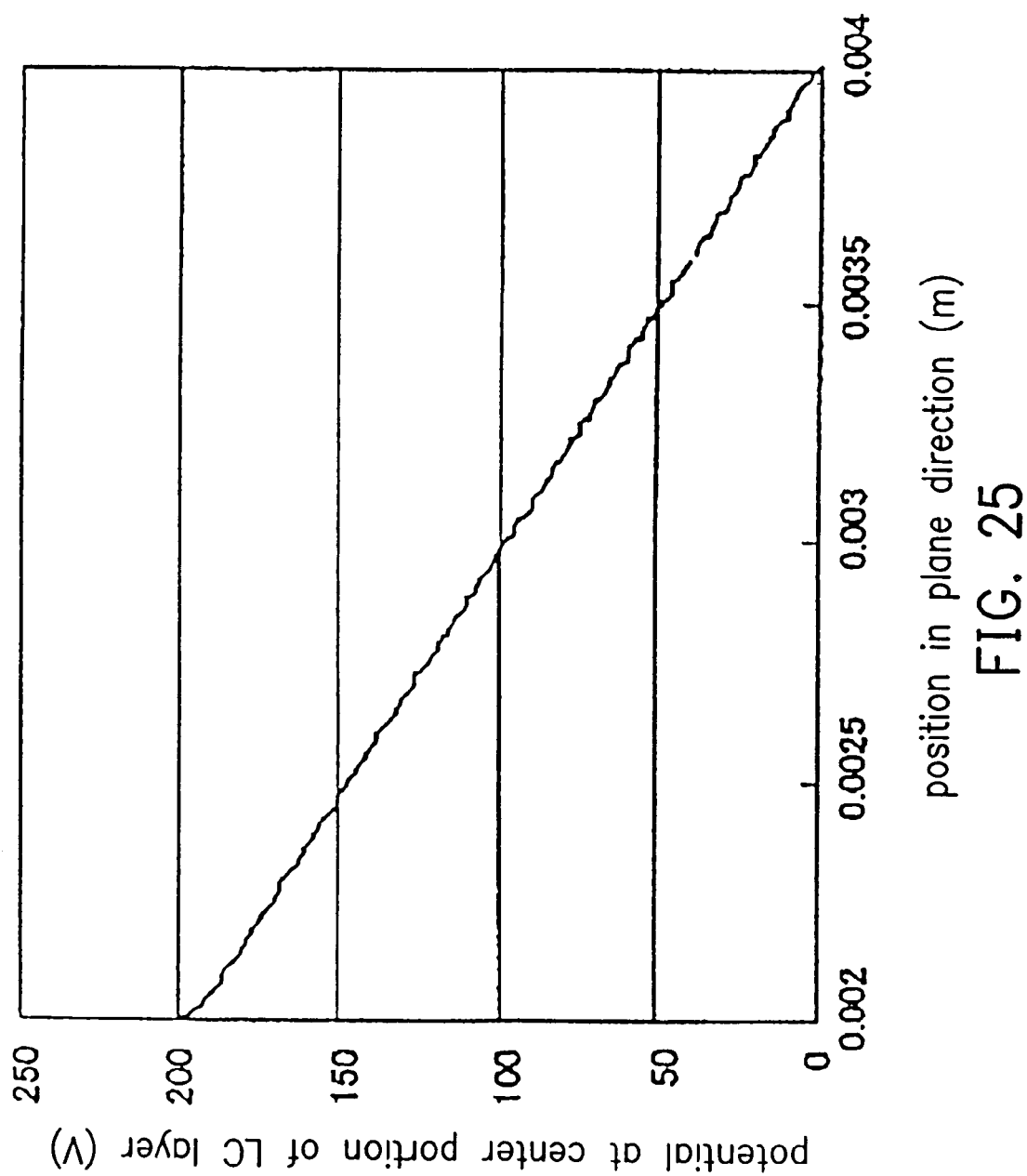
FIG. 25 shows a potential distribution where the spacers also serve as electrodes.
Figure 26:
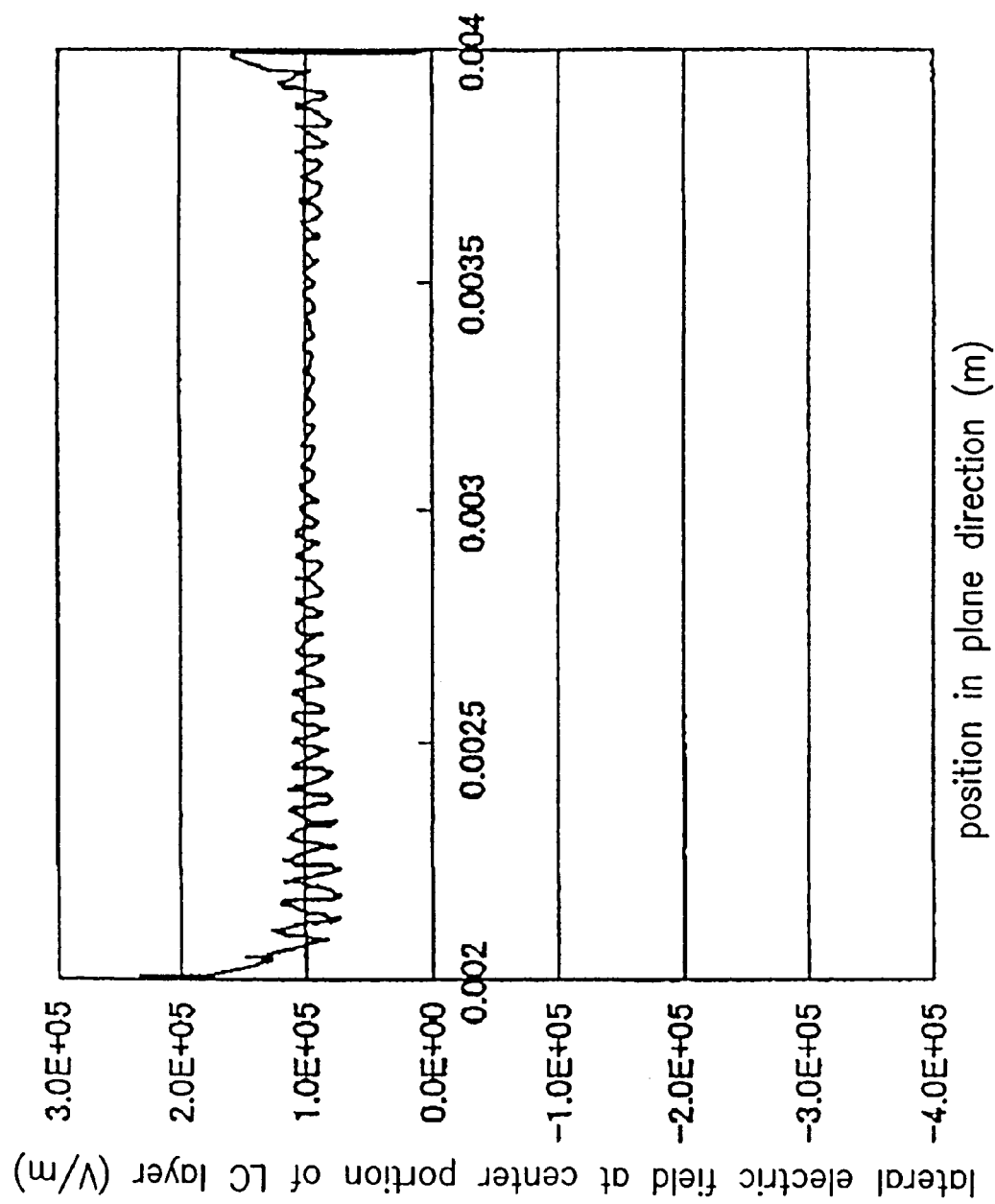
FIG. 26 shows a distribution of electric field where the spacers also serve as electrodes.

From a simulation result of a two-dimensional electric field, the voltage distribution and the electric field distribution at the center portion of the liquid crystal layer can be obtained as shown in FIG. 25 and FIG. 26. In this configuration, it could be understood that even though near the spacers, a more uniform electric field can be obtained.

Fifteenth Embodiment

Figure 27:
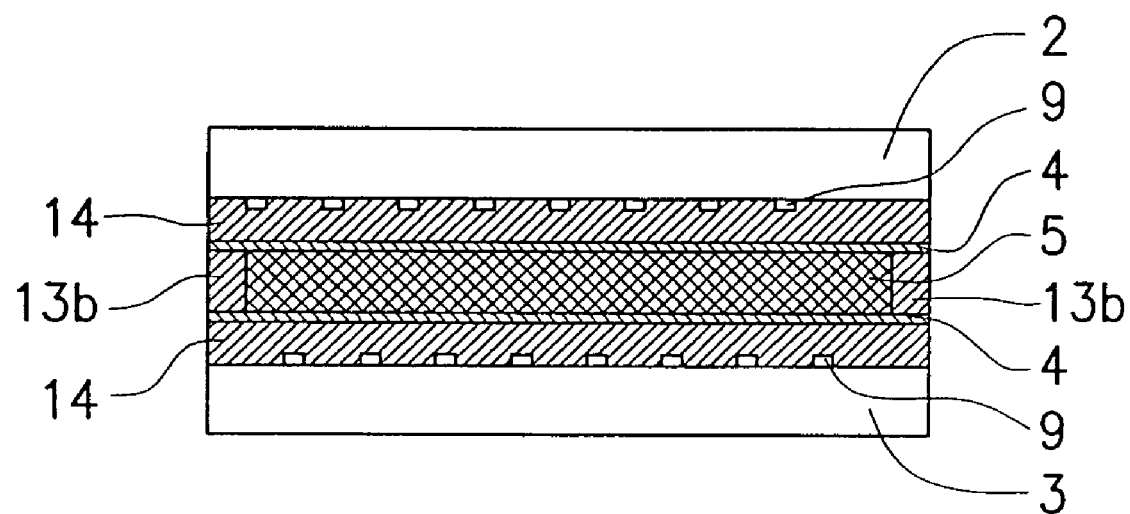
FIG. 27 is a diagram for describing one embodiment of the invention.

FIG. 27 shows the fifteenth embodiment of the present invention. As shown in FIG. 27 dielectric layers 14 are formed on the substrates 2, 3 where electrode lines 9 are formed thereon respectively, and the two sets of electrode lines 9 on the two substrates 2, 3 are arranged in an interleaved manner. The alignment layer 4 is formed between the dielectric layer 14 and the liquid crystal layer 5. The dielectric layer 14 can use glass or resin etc having high transparence. In addition, because an alignment layer for the homeotropic alignment is formed between the dielectric layer 14 and the liquid crystal layer 5, it is preferred to choice a method that the dielectric layer is not degraded when the alignment layer is formed. In particularly, when the dielectric layer and the alignment layer are resin, it has to optimize the coating solvent for the both. By sandwiching the dielectric layer 14 between the liquid crystal layer 5 and the forming surface of the electrode lines 9, the discontinuous potential distribution applied to the electrode lines 9 is blunt and therefore, the potential gradient becomes uniform in the plane direction within the liquid crystal layer.

Therefore, the strength distribution of the electric field becomes uniform in the plane direction within the liquid crystal layer, an uniform deflection of the light path can be obtained. Preferably, the spacers in this embodiment can be the electrode pair 13a, 13b made of conductive material. Additionally, in order to make the regions on the electrode lines 9 serve as a function of light path deflection regions, transparent electrode lines are preferred.

Following is an experiment of the above embodiment. Similar to the fourteenth embodiment described above, the substrate that is the same as the previous embodiment is used. The surface of the substrate for forming the ITO transparent electrode lines is adhered with a mylar sheet that has a thickness of 50 µm and processed by a hard coat process. A commercial alignment for vertically aligning the liquid crystal is coated on the mylar sheet to obtain the substrate. Similar to the previous embodiment, the same cell is made, and each ITO transparent electrode line is connected to the series-connected resistors. Using the pulse generator and the high-speed power amplifier, a rectangular voltage of ±200V is applied across the two ends of the series-connected resistors and to the aluminum electrode sheets. As a result, a light path shift amount of about 5 µm at all regions of the light path deflection element having a width of 2 mm, and a response time of 0.3 msec can be confirmed.

Figure 28:
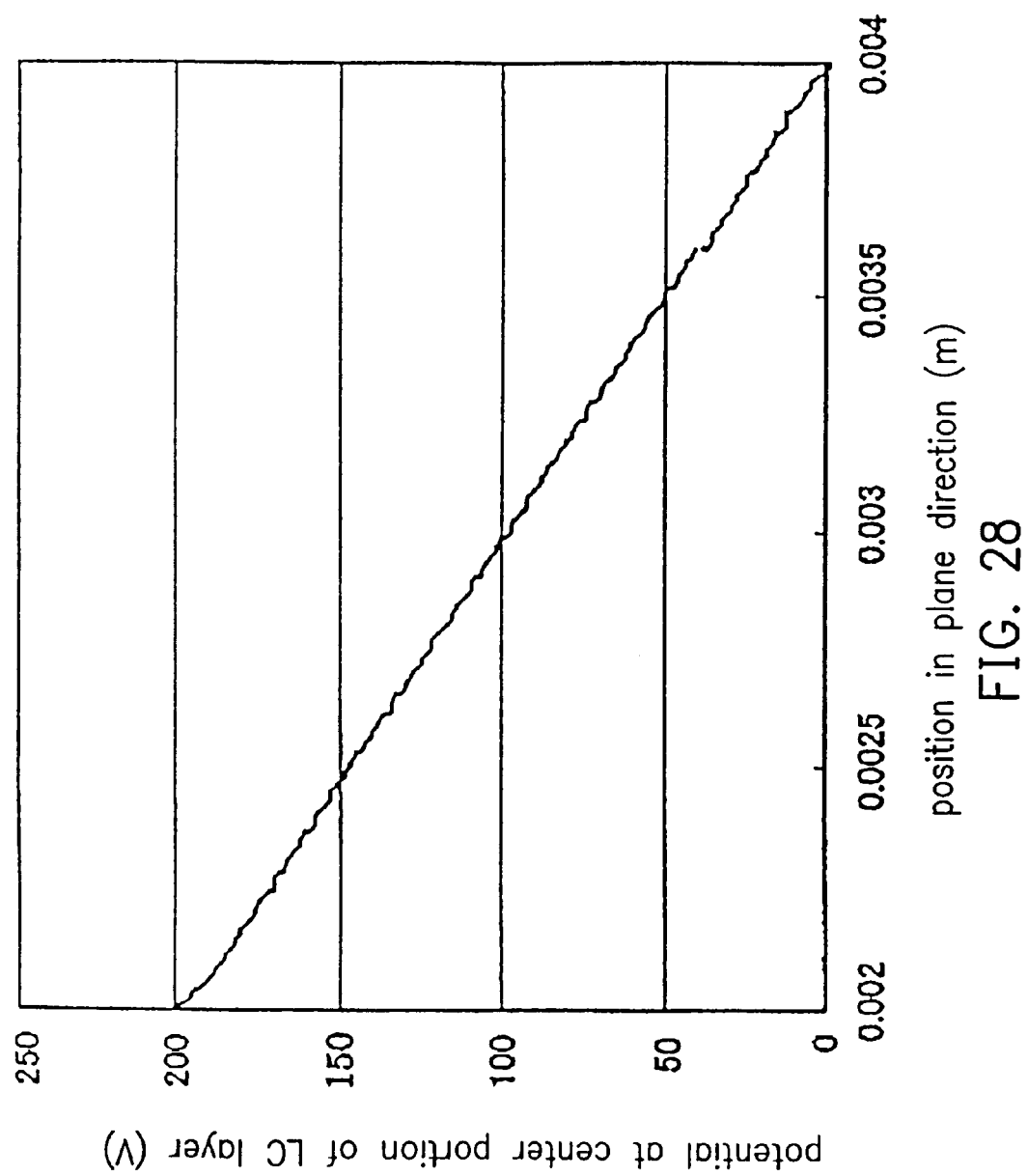
FIG. 28 shows a potential distribution where there exists dielectric layers.
Figure 29:
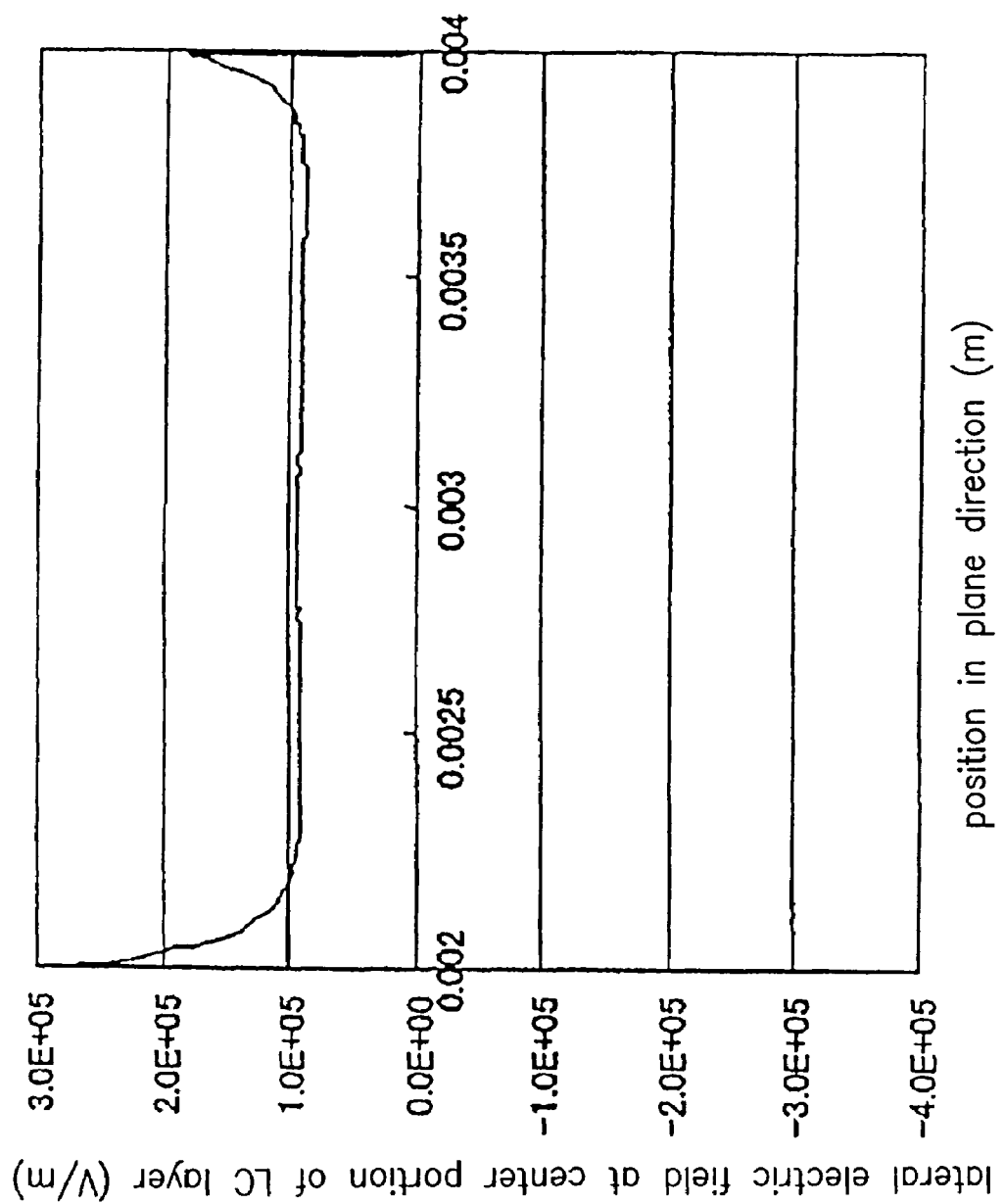
FIG. 29 shows a distribution of electric field where there exists dielectric layers.

With the same condition in the fourteenth embodiment, from a simulation result of a two-dimensional electric field in which the relative dielectric constant of the mylar sheet is 3.0, the voltage distribution and the electric field distribution at the center portion of the liquid crystal layer can be obtained as shown in FIG. 28 and FIG. 29. In this configuration, the strength of the electric field is increased near the spacers, and therefore, it could be understood that a very uniform electric field in the lateral direction occurs in vicinity of the light path deflection element.

Sixteenth Embodiment

Regarding the light deflection element of the invention, in comparison with the thinner liquid crystal layer with a thickness of about from several ten mm to several hundred µm, because the separation between electrodes is from several mm to several ten mm and thus very wide, it is difficult to apply an uniform electric field between the electrodes. From a simulation result using a differential method with the above configuration, the strength of the electric filed in the horizontal direction in the liquid crystal is higher in vicinity of the electrodes, but is lower at the center of the element. Therefore, when the light shift amount is dependent on the electric field, the light shift amount will be different due to the position in the element. As a result, in the invention, when the light is deflected, the output of the electric field applying device is set so that the strength of the electric field in the whole liquid crystal layer is above Es. Therefore, if the thickness d of the liquid crystal layer and the temperature T is set constant, even though the electric filed applied is not uniform, the light shift amount can be kept constant. Namely, regarding the variation of the electric field, because an electric field above the saturated electric field Es is applied to keep a constant light shift amount, even though the electric field in the liquid crystal layer is not uniform, the shift amount of the light path can be constant and independent of the positions.

The surface of a glass substrate with a size of 3 cm×4 cm and a thickness of 1.1 mm is processed by silane coupling agent (AY43-021, made by Toray Dow Corning Silicon) to form a vertical alignment layer. Two aluminum electrode sheets, which have a thickness of 40 µm or 100 µm, a width of 1 mm and a length of 3 cm and are also used as spacers, are arranged on the inner surfaces of the vertical alignment layer to support the two glass substrates. The two aluminum sheets are parallel and have a separation of 1 mm. The substrate is heated up to 90° C., and then ferroelectric liquid crystal (CS1029, made by Chisso Corporation, Japan) is filled between the two substrates by a capillary method. After being cooled, using an adhesive to seal to form a light deflection element.

Figure 30:
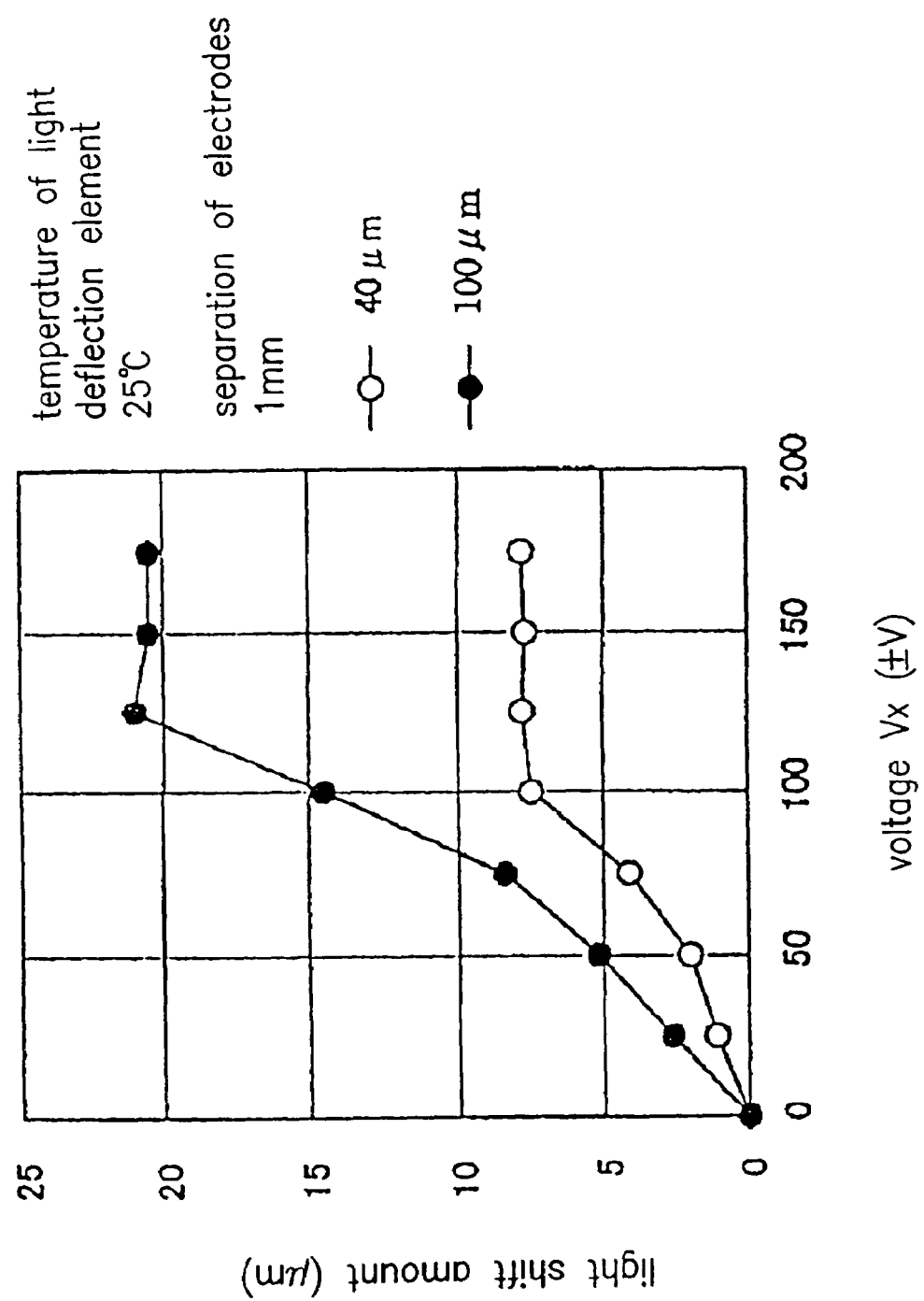
FIG. 30 shows the variation of the light shift amount with respect to the applied voltage.

A mask pattern with a line/space having a width of 24.5 µm is set on the incident surface of the light deflection element, and a collimated linear polarized light illuminates from the mask pattern side. The direction of the linear polarization is set as the same as the longitudinal direction of the aluminum electrode sheets. The temperature of the light deflection element is set at 25° C. to observe by a microscope that the light travels between the two aluminum electrode sheets by passing through the mask pattern. A rectangular voltage up to about ±200V is applied across the two electrode sheets by using a pulse generator and a high-speed power amplifier. In this manner, the mask pattern is parallel shifted is observed. Because the mask pattern or the light deflection element, the microscope is mechanically still, the light path is electrically shifted can be thus confirmed. FIG. 30 shows the variation of the light shift amount with respect to the applied voltage. As the voltage increases, the light shift amount increases, in which the light shift amount is saturated as the voltage is from 100V to above 125V. Namely, as the strength of the electric field is from 100 V/mm to above 125 V/mm, the light shift amount is saturated. In addition, it can also confirm that the light shift amount is proportional to the thickness of the liquid crystal.

Next, the separation of the electrode sheets is set 2 mm to perform the same experiment. The light shift amount at the center of the light deflection element is saturated when the voltage is above 300V and the strength of the electric field is about 150 V/mm. In comparison with the above element with a separation of 1 mm, the required electric field becomes larger, because he distribution of the electric field become non-uniform due to increasing the separation of the electrode sheets. The effective strength of the electric field near the central portion is smaller that a calculated value of 150 V/mm. At this time, even thought near the end portions of the light deflection element, the light shift amount is constant. As a result, regarding the variation of the electric field, because an electric field above the saturated electric field Es is applied to keep a constant light shift amount, even though the electric field in the liquid crystal layer is not uniform, the shift amount of the light path can be constant and independent of the positions.

Seventeenth Embodiment

Figure 31:
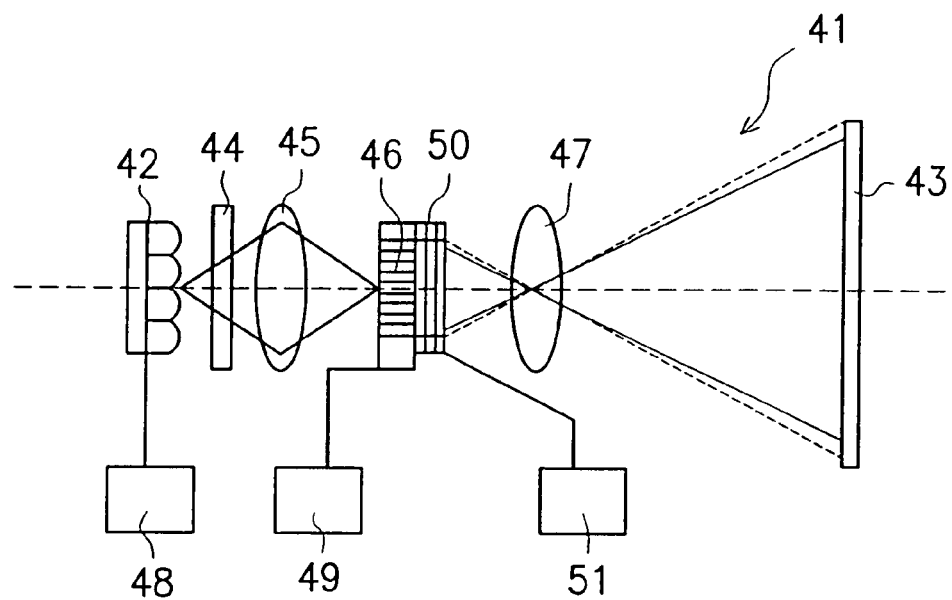
FIG. 31 schematically shows a side view of an image display device according to the eleventh embodiment of the invention.

The seventeenth embodiment of the invention is described with reference to FIG. 31. The embodiment is an application of an image display device 41. As shown in FIG. 31, a light source 42 is formed of LED lamps that are arranged in a two dimensional array. A diffusion plate 44, condensing lens 45, a transmission type liquid crystal panel 46 serving as an image display element, and a projecting lens 47 serving as an optical device for observing the image pattern are arranged in sequence along the direction of the light propagation from the light source 42 to a screen 43. A light driver 48 is used for driving the light source 42 and a liquid crystal driver 49 is used for driving the transmission type liquid crystal panel 46.

A light deflection device 50 serving a pixel shifting element is formed on an optical path between the transmission type liquid crystal panel 46 and the projecting lens 47, and is connected to a driver 51. The light deflection apparatus 50 can use the light deflection elements 1, 21, 23, 32, 33, 34, or the light deflection devices 10, 14, 16, 36 etc. that are described previously.

The illuminating light from the light source 42 is controlled by the light driver 48, and uniformed by the diffusion plate 44. The illuminating light passing through the condensing lens 45 is controlled by the liquid crystal driver 49 to be synchronized with light source 42, and then illuminates the transmission type liquid crystal panel 46. Serving as the image light, the illuminating light, spatially modulated by the transmission type liquid crystal panel 46, is incident to the light deflection apparatus 50. Due to the light deflection apparatus 50, the image light can be shifted by any distance in the arrangement direction of the pixels. Thereafter, the light out of the light deflection apparatus 50 is projected through the projecting lens 47 onto the screen 43.

The image field is divided into a plurality of sub-fields in the time domain by the light deflection device 50. The image patterns are displayed in a state that the display position is shifted according to the deflection of the optical path for each sub-field. Therefore, the appearance pixel number of the transmission type liquid crystal panel 46 is doubled to that displayed. As described, because the image is doubled with respect to the alignment direction of the image of the transmission type liquid crystal panel 46, the shifting amount by the light deflection device 50 is set to half of the image pitch. A high-quality image can be displayed by correcting the shifting amount of the image signal that driving the transmission type liquid crystal panel 46 in response to the shifting amount. The light deflection device 50 can use the light elements described in the foregoing embodiments, and therefore, the light utility rate can increase and a bright and high-quality image can be provided to the viewer without increasing the loading of the light source. In particular, when the light deflection element 1 in FIG. 8 is used, a suitable pixel-shifting amount can be maintained and a good image can be obtained by performing the temperature control to the light deflection element and direction control of the electric field applied by the electrode pair 6 of the light deflection element 1.

A conventional example of the light deflection device used for the pixel shift element assembled in the image display device is described. The light deflection device (optical element) is used for performing the light shift at four positions: two horizontal and two vertical directions (two dimensional four-pixel shift). Two combinations of the crystal phase modulation element composed of ferroelectric liquid crystal etc. and the birefringent medium composed of optoelectronic element etc. are respectively arranged in the horizontal and vertical directions. The optical element has the following disadvantages:

(1) Because the light deflection is achieved by the combination of the crystal phase modulation element and the birefringent medium, light loss occurs at their interface.

(2) Similarly, the light scatter occurs at the interface, the contrast becomes lower easily.

(3) Because high-price optoelectronic elements for the birefringent medium are used, the cost becomes higher.

Due to the foregoing problems, not only can excellent image quality not be obtained, but also the apparatus cost increases significantly.

Because the light deflection apparatus 50 of the embodiment has the structure that is described in the previous embodiments and the above shortcomings can be solved, the image display device of the embodiment can achieve an excellent image quality and a low cost.

Figure 32:
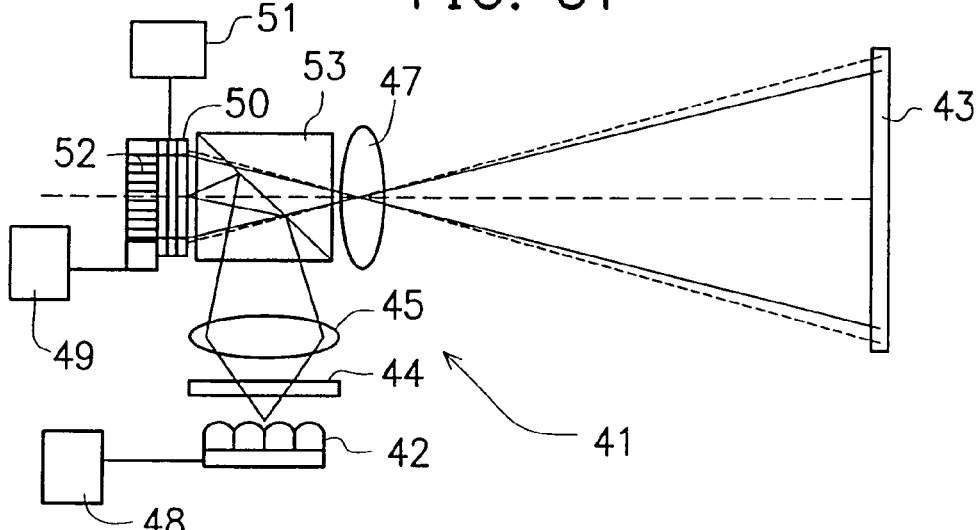
FIG. 32 schematically shows a side view of one variation of the image display device in FIG. 31.

The image display element of the image display device 41 is not limited to the transmission type liquid crystal panel 46. For example, as show in FIG. 32, a reflection type liquid crystal panel 52 is also suitable. In this situation, a polarization beam splitter (PBS) 53 is added in place of the image display device 41 in FIG. 31. The light from the illuminating system is reflected to the reflection type liquid crystal panel 52 by the PBS (polarization beam splitter) 53, and then illuminates on the reflection type liquid crystal panel 52 through the light deflection device 50. The illuminating light incident to the reflection type liquid crystal panel 52 is reflected by a reflection plate (not shown) installed on the back of the liquid crystal panel 52, spatially modulated according to the image, and then transmitted as the image light. Then, the image light is incident to the light deflection device 50. The image light is shifted by a predetermined distance in the arrangement direction of the pixels by the light deflection device 50. Afterwards, the optical path is the same as the reflection type liquid crystal panel 52 shown in FIG. 32.

Eighteenth Embodiment

Figure 33:
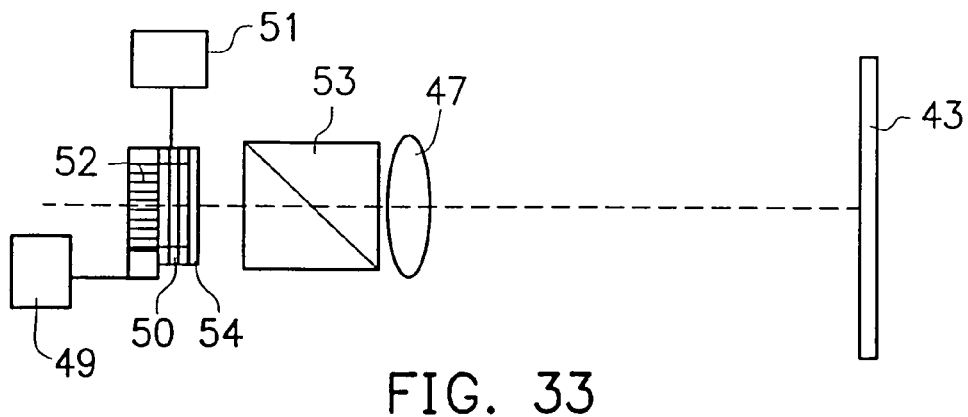
FIG. 33 schematically shows a side view of an image display device according to the twelfth embodiment of the invention.

The eighteenth embodiment of the invention is described with reference to FIG. 33. According to the embodiment, a temperature sensor 54 is added to the image display device 41 in FIG. 32 at a position not affecting the optical path of the light deflection device 50, wherein the light deflection device 50 is composed of the light deflection element 1 that includes the electrical resistant material 17 (serving as the heating source) in FIG. 8. The temperature sensor 54 is a thermo resist. However, a thermocouple capable of monitoring the temperature can be also used. The temperature information from the temperature sensor 54 is transmitted to the driver 51 connected to the light deflection device 50 such that a difference with a preset temperature can be detected. A current is applied to the electrical resistant material 17 composed of the ITO in the light deflection element 1 to generate the Joule heat such that the difference from a preset temperature can be reduced.

The temperature is set above an environment temperature around the light deflection element 1 (the light deflection device 50) and within a range capable of obtaining a suitable inclined angle θ. In general, the temperature can be set within a range of about 40° C.~70° C.

The control of the light deflection position is performed by the direction of the electric field applied by the electrode pair 6 of the light deflection element 1 and the temperature control applied to the light deflection element 1. Therefore, a suitable pixel-shifting amount can be maintained and the image quality is excellent.

According to the light deflection element of the invention, because a chiral smectic C phase liquid crystal is used, the problems of the conventional light deflection element, such as high cost, light loss, large size, and optical noise etc. due to its complicated structure, can be greatly improved. In addition, because of no movable parts, the problems of the conventional light deflection element, such as low position accuracy, worse durability, vibration, and noise etc due to its movable parts, can be avoided. Furthermore, the invention also improves the conventional low response time because the conventional light deflection element uses the smectic A phase liquid crystal or the nematic liquid crystal, thereby the high-speed response is possible. In addition, because the liquid crystal directors have the homeotropic alignment with respect to the substrate, a stable shifting amount and rotational angle can be obtained by a low electric field. The operation of the liquid crystal directors are hardly affected by the restricting force from the substrate. The direction of the light deflection can be easily adjusted by adjusting the direction of the external electric field such that the setting margin of the optical element increases. Moreover, because the alignment of states of the liquid crystal directors with respect to the direction of the electric field is easy, the unevenness of the light strength in the deflection direction hardly occurs.

According to the invention, the optical path can be efficiently switched and the light loss is reduced in comparison with the conventional light deflection element.

According to the invention, by combining the above two light deflection elements and the ½ wavelength plate, the light can be shifted to four directions such as up, down and left, and right direction.

According to the invention, because the light deflection element having two sets of perpendicular electrode pairs is provided, the light can be shifted in four directions, up, down, left and right direction. In particular, because only one light deflection element is used, the size can become smaller, the cost and the light loss can be reduced too.

According to the invention, the electric field applying device can be one set of electrode pairs and arranged between the transparent substrates. Regarding the electric field applying device of the light deflection element, a voltage to generate an electric field by the electric field applying device can be reduced, thereby the power source can become smaller and the cost reduces.

According to the invention, the electrode pairs mentioned above can be interleaved and arranged in a comb-teeth shape. Therefore, regarding the electric field applying device of the light deflection element, because the electric field generated by the electric field applying device can be applied to the liquid crystal more efficiently, thereby the power source can become smaller and the cost reduces.

According to the invention, the electric field applying device is two sets of comb-teeth shape electrode pairs and is formed at interfaces between the liquid crystal and the transparent substrates, and directions of the electric fields generated by the two sets of comb-teeth shape electrode pairs are opposite. Therefore, it is possible to effectively switch the optical path in at least three directions by one light deflection element.

According to the light deflection device of the invention, it comprises a light deflection element having a configuration as described above, and a polarization direction switching device. The polarization direction switching device is arranged at an incident side of the light deflection element for controlling a polarization direction of an incident light such that the polarization direction of the incident light is aligned with a light deflection direction caused by the light deflection element. Therefore, the mixture probability, between a first component on a first optical path that is deflected by the applied electric field in a certain direction and a second component on a second optical path that is not deflected or deflected by the applied electric field in a different direction, can be greatly reduced. Thus, the optical noise becomes small and the excellent light shift can be achieved.

According to the light deflection device of the invention, it comprises a light deflection element having a configuration as described above and a polarization direction switching device, arranged at an incident side of the light deflection element for controlling a polarization direction of an incident light such that the polarization direction of the incident light is rotated by a predetermined angle with a light deflection direction caused by the light deflection element. Therefore, the ratio of the first component on the first optical path that is deflected by the applied electric field in a certain direction and the second component on the second optical path that is not deflected or deflected by the applied electric field in a different direction can be set on demand. Accordingly, the light deflection amount can be freely controlled.

According to the light deflection element of the invention, by using the chiral smectic C phase liquid crystal, the invention can achieve the effects described in the embodiments. In particular, because the chiral smectic C phase liquid crystal with a homogeneous alignment is used, the unevenness at the location where light deflection occurs within the element can be reduced as much as possible, thereby the optical noise can be further decreased.

According to the invention recited in claim 11, by using the chiral smectic C phase liquid crystal, the invention can achieve the effects described in the embodiments. Because the chiral smectic C phase liquid crystal with a homogeneous alignment is used, the unevenness at the location where light deflection occurs within the element can be reduced as possible, thereby the optical noise can be further decreased. Furthermore, transparent electrodes made of ITO etc. are preferred for the electric field applying device, i.e., a whole film can be used as the electrodes, and thereby the electrodes can be formed easily. Because it is not necessary to pattern the electrodes, no interference, such as the moiré, occurs to interfere with the light propagation. In addition, in comparison with the electric field that is generated by the external electrodes, the invention doesn't require a high voltage source, thereby the device size can be decreased.

According to the invention recited in claim 12, by using the chiral smectic C phase liquid crystal, the invention can achieve the effects described in the embodiments. The outgoing light possesses a certain angle with respect to the incident light and can be rotated so that the optical path can be switched, thereby the response time can be improved.

According to the light deflection device of the invention, because two light deflection elements are separated by a predetermined distance along a light propagating direction, any deflection amount can be obtained by properly choosing a distance between the light deflect element and the light-receiving portion without sacrificing the response time.

According to the invention, each configuration of the above light deflection elements can further comprise a light deflection position controlling device for controlling a light deflection position by performing a temperature control to the light deflection element and the direction of the electric field generated by the electrode pair. Therefore, the inclined angle can be controlled by temperature, and the light deflection can be controlled. Additionally, regarding the position control, a suitable light deflection can be achieved with a fine tune by the electric field According to the image display device of the invention, the image field is divided into a plurality of sub-fields in the time domain by the light deflection device 50. The image patterns are displayed in a state that the display position is shifted according to the deflection of the optical path for each sub-field. Therefore, the appearance pixel number of the transmission type liquid crystal panel 46 is doubled to that displayed. Because the light deflection device composed of the pixel shift element utilizes the various embodiments of the invention, the light utility rate can increase and a bright and high-quality image can be provided to the viewer without increasing the loading of the light source. In particular, when the light deflection element 1 in the fifth embodiment is used, a suitable pixel-shifting amount can be maintained and a good image can be obtained by performing the temperature control to the light deflection element and direction control of the electric field applied by the electrode pair of the light deflection element.

A plurality of electrode lines are formed on regions (light path regions), where light is desired to pass through, of the light path deflection element. The voltage value applied to each electrode line is stepwise varied from the most end line. Over the entirely region of the electrode line group, macroscopically, a smooth potential gradient is made in the plane direction within the liquid crystal layer. In this way, at least the effective portions at which form desired electric field strength in the liquid crystal layer over the entirely light path region can be discretely obtained. Furthermore, only the effective portions are utilized, the light path with a large cross-sectional area can be more uniformly deflected in the thickness direction of the liquid crystal layer.

By forming the electrode lines on the two substrates, the potential distribution in the thickness direction of the liquid crystal layer becomes more uniform. Namely, because the strength of the electric field in the thickness direction of the liquid crystal layer can be small, and therefore, when applying the electric field, the direction of the directors of the liquid crystal molecules can becomes more uniform in the thickness direction of the liquid crystal layer, so that the light path can be effectively deflected.

As the separation of the electrode lines is wide, a portion with a low potential near the center between lines occurs and therefore, a reverse electric field may activate. However, the electrode lines on the upper and the lower substrates are interleavedly arranged and the voltage values applied are also interleavedly varied, so that the potential variation in the plane direction of the liquid crystal layer becomes more uniform and the occurrence of the reverse electric field can be prevented. In addition, the electrode is made of transparent material, so that the regions on the electrode lines can have a function to serve as the light path deflection region. Therefore, the light path with a large cross-sectional area can be more uniformly deflected.

In Addition to applying stepwise voltages to the electrode lines in the light path region, by using the spacer exterior to the light path region to serve as the electrodes, because the auxiliary voltage is applied and the potential gradient is smooth in the plane direction of the liquid crystal layer, the light path with a large cross-sectional area can be more uniformly deflected.

When the potential gradient near the electrode line group is periodically varied, a dielectric layer is sandwiched between the liquid crystal layer and the electrode line group, and therefore, the variation of the potential gradient in the plane direction of the liquid crystal layer becomes small. Accordingly, a uniform distribution of the electric field strength can be obtained.

According to the above description of the invention, the problem of the conventional light deflection element, i.e., its complicated structure, and the high cost, the enlarged device, the light loss, and the optical noise can be improved, and the structure of the invention is simple and small. The light deflection element of the invention can reduce the light loss, the optical noise, the resolution reduction and the cost. Namely, regarding the variation of the electric field, because an electric field above the saturated electric field Es is applied to keep a constant light shift amount, even though the electric field in the liquid crystal layer is not uniform, the shift amount of the light path can be constant and independent of the positions.

While the present invention has been described with a preferred embodiment, this description is not intended to limit our invention. Various modifications of the embodiment will be apparent to those skilled in the art. It is therefore contemplated that the appended claims will cover any such modifications or embodiments as fall within the true scope of the invention.

What is claimed is:

1. A light-path deflection element comprising:
a liquid crystal layer of chiral smectic C phase having a homeotropic alignment;
an electrode; and
an electric field applying device applying a voltage to said electrode, said electric field applying device and said electrode applying an electric field to said liquid crystal layer in a direction parallel to a surface of said liquid crystal layer,
wherein said electric field applying device controls an electric field caused by said electrode by switching a voltage applied to said electrode with an arbitrary timing.

2. The light-path deflection element as claimed in claim 1, wherein said electric field applying device controls a direction of said electric field when said driver circuit controls said electric field.

3. The light-path deflection element as claimed in claim 1, wherein said electrode is formed of at least a pair of electrode components.

4. The light-path deflection element as claimed in claim 1, wherein said driver circuit controls a direction of said electric field when said electric field applying device controls said electric field, and wherein said direction of said electric field is generally perpendicular to a rotational axis of said liquid crystal layer.

5. The light-path deflection element as claimed in claim 1, wherein said light-path deflection element deflects an optical path in at least two directions.

6. The light-path deflection element as claimed in claim 1, wherein said electrode is provided in said liquid crystal layer.

7. The light-path deflection element as claimed in claim 1, wherein said electrode comprises electrode lines having respective voltages controlled independently from each other.

8. A light-path deflection device, comprising:
at least two light-path deflection elements; and
a polarization direction switching device switching a polarization direction between said light-path deflection elements,
each of said light-path deflection elements comprising:
a liquid crystal layer of chiral smectic C phase having a homeotropic alignment;
an electrode; and
an electric field applying device applying a voltage to said electrode, said electric field applying device and said electrode applying an electric field to said liciuid crystal layer in a direction parallel to a surface of said liquid crystal layer,
wherein said electric field applying device controls an electric field caused by said electrode by switching a voltage applied to said electrode with an arbitrary timing.

9. The light-path deflection device as claimed in claim 8, wherein said electric field applying device controls a direction of said electric field when said driver circuit controls said electric field.

10. The light-path deflection device as claimed in claim 8, wherein said two light-path deflection elements are disposed such that respective deflection directions are different from each other.

11. The light-path deflection device as claimed in claim 8, wherein said polarization direction switching device comprises a half-wavelength device.

12. The light-path deflection device as claimed in claim 8, wherein said light-path deflection device deflects an optical path of a light in at least two directions.

13. The light-path deflection device as claimed in claim 8, wherein said driver circuit controls a direction of said electric field when said electric field applying device controls said electric field, and wherein said direction of said electric field is generally perpendicular to a rotational axis of said liquid crystal layer.

14. An image forming apparatus, comprising:
an optical source;
an image display element modulating a light from said optical source and emitting an image light;
a light-path deflection element deflecting a path of a light; and
a projection part projecting said image light,
said light-path deflection element comprising a liquid crystal of chiral smectic C phase having a homeotropic alignment, an electrode, and a voltage applying unit applying a voltage to said electrode, said electric field applying device and said electrode applying an electric field to said liQuid crystal layer in a direction parallel to a surface of said liciuid crystal layer, said voltage applying unit having a construction of controlling an electric field caused by said electrode by switching a voltage applied to said electrode with an arbitrary timing, said light-path deflection element being provided between said image display element and said projection part.

15. The image forming apparatus as claimed in claim 14, wherein said light-path deflection element deflects a light in at least two directions.

16. The image forming apparatus as claimed in claim 14, wherein there are provided at least two said light-path deflection elements.

17. The image forming apparatus as claimed in claim 14, further comprising a polarization direction switching device that switches the polarization direction.

18. The image forming apparatus as claimed in claim 17, wherein said electric field applying device controls a direction of said electric field when said driver circuit controls said electric field.

19. The image forming apparatus as claimed in claim 17, wherein said driver circuit controls a direction of said electric field when said electric field applying device controls said electric field, and wherein said direction of said electric field is generally perpendicular to a rotational axis of said liquid crystal layer.

* * * * *